US011920546B2

(12) United States Patent
Ruvalcaba

(10) Patent No.: US 11,920,546 B2
(45) Date of Patent: Mar. 5, 2024

(54) BUFFERED INTERNAL COMBUSTION ENGINE

(71) Applicant: Jaime Ruvalcaba, Round Rock, TX (US)

(72) Inventor: Jaime Ruvalcaba, Round Rock, TX (US)

( * ) Notice: Subject to any disclaimer, the term of this patent is extended or adjusted under 35 U.S.C. 154(b) by 0 days.

(21) Appl. No.: 18/319,031

(22) Filed: May 17, 2023

(65) Prior Publication Data

US 2023/0374957 A1 Nov. 23, 2023

Related U.S. Application Data

(60) Provisional application No. 63/438,293, filed on Jan. 11, 2023, provisional application No. 63/342,654, filed on May 17, 2022.

(51) Int. Cl.
*F02M 26/01* (2016.01)
*F02B 1/04* (2006.01)

(52) U.S. Cl.
CPC ............... *F02M 26/01* (2016.02); *F02B 1/04* (2013.01)

(58) Field of Classification Search
CPC .................................. F02M 26/01; F02B 1/04
USPC ..................................................... 123/568.14
See application file for complete search history.

(56) References Cited

U.S. PATENT DOCUMENTS

| | | | |
|---|---|---|---|
| 1,751,385 | A | 3/1930 | Paul |
| 3,880,126 | A | 4/1975 | Thurston et al. |
| 6,907,859 | B1 | 6/2005 | Robinson |
| 7,050,900 | B2 | 5/2006 | Miller et al. |
| 7,177,751 | B2 | 2/2007 | Froloff et al. |
| 7,255,082 | B2 | 8/2007 | Zajac et al. |
| 7,415,947 | B2 | 8/2008 | Zajac |
| 7,434,551 | B2 | 10/2008 | Zajac et al. |
| 7,559,317 | B2 | 7/2009 | Robinson |
| 7,823,547 | B2 | 11/2010 | Forner et al. |
| 8,210,138 | B2 | 7/2012 | Scuderi et al. |
| 8,360,019 | B2 | 1/2013 | Scuderi et al. |
| 8,689,745 | B2 | 4/2014 | Meldolesi et al. |
| 8,800,510 | B2 | 8/2014 | Carlson et al. |
| 8,997,488 | B2 | 4/2015 | Guzzella et al. |
| 9,096,116 | B2 | 8/2015 | Reuss et al. |
| 9,133,758 | B2 | 9/2015 | Meldolesi et al. |
| 9,297,295 | B2 | 3/2016 | Scuderi et al. |
| 10,598,080 | B2 | 3/2020 | Tour et al. |

(Continued)

FOREIGN PATENT DOCUMENTS

| | | | |
|---|---|---|---|
| CN | 205908371 U | * | 1/2017 |
| CN | 108374719 A | * | 8/2018 |

(Continued)

OTHER PUBLICATIONS

CN205908371U (Li, G) (Jan. 25, 2017) (Machine Translation) (Year: 2017).*

*Primary Examiner* — Mahmoud Gimie

(57) ABSTRACT

Internal combustion engine and method for buffering of combustion gases and fresh air in a storage tank and producing power, torque and other functions by consuming buffered gases from storage tank for improved efficiency, improved power and torque, reduced emissions, immediate response to increase or decrease power and torque requests, new and improved functionality, kinetic energy recovery, thermal energy recovery and increased ECM flexibility.

18 Claims, 24 Drawing Sheets

(56) References Cited

U.S. PATENT DOCUMENTS

| | | | | |
|---|---|---|---|---|
| 10,655,549 | B2 | 5/2020 | Ruiz | |
| 11,391,198 | B2 | 7/2022 | Morgan et al. | |
| 2021/0131313 | A1* | 5/2021 | Stankovic | F01K 23/10 |
| 2022/0154658 | A1 | 5/2022 | Owen et al. | |

FOREIGN PATENT DOCUMENTS

| | | | |
|---|---|---|---|
| GB | 2350881 | A | 12/2000 |
| WO | 2015013696 | A1 | 1/2015 |

* cited by examiner

BUFFERED INTERNAL COMBUSTION ENGINE

RELATED APPLICATIONS

This application claims priority to U.S. Provisional Application No. 63/342,654, filed on May 17, 2022, and U.S. Provisional Application No. 63/438,293 filed on Jan. 11, 2023.

BACKGROUND OF THE INVENTION

In Standard Four Stroke Internal Combustion Engines (S4S-ICE), each cylinder-piston provides all four strokes. The resulting high pressure and temperature combustion gases are consumed in the same cylinder, producing work. This process is "Single Cycle Synchronous" and very inefficient by nature because a good part of the fuel's thermal energy is lost in the exhaust system and produces noise and air contamination.

Split Cycle is the idea of splitting the Admission/Compression strokes into a set of cylinders and the Ignition/Expansion/Exhaust into a different set. In standard Split Cycle Engine designs, a "Crossover Passage" connects each pair of cylinders, fuel is normally injected inside the Crossover Passage, and the explosion is initiated inside the Expansion Cylinders. Split Cycle Engines have the same problem as S4S-ICEs, where the process is still "Single Cycle Synchronous" by nature, and a good portion of the Thermal Energy is lost in the Exhaust System.

In "John Zajac" Split Cycle Engine designs, a common "Combustion Chamber" connects all cylinders. A dedicated group of pistons feed compressed air to the Combustion Chamber where fuel is normally injected and the combustion is initiated inside said combustion chamber. A different set of pistons take HPG from the Combustion Chamber and produce work in the Expansion-Exhaust strokes. The problem with these engines is trying to burn the air-fuel mixture inside the combustion chamber. This process is technically difficult, limits the maximum pressure of the Combustion Chamber, and is completely different than the S4S-ICE model.

HPG Storage Tank in Patents: Some patents include a storage tank in its design (e.g., 9096116, 10655549, 7050900) mainly a "Compressed Air" storage tank to have some Kinetic Energy Recovery, to boost the air volume during admission or to be used externally. Zajac's engine patents (e.g., 7255082, 7415947, 7434551) include an HPG storage tank (called Combustion Chamber), but his designs have one major challenge, which is burning fuel under high pressure inside the tank limits the maximum pressure the tank can contain.

Cylinder Types in Patents: S4S-ICEs have a single cylinder type with intake and exhaust valves, plus fuel admittance and ignition starter. Split Cycle engines have two cylinder types: an Air Compressor type and an Expansion-Exhaust Cylinder type. Buffered ICEs Cylinder types may be any of the following: similar to Split Cycle Engine types, all cylinders similar to S4S-ICEs, or any combination of the previous types per design. Note that all cylinders in Buffered ICEs must have a valve that communicates to the HPG storage tank.

Power Level Connector in Patents: This feature already exists in the patent systems (Split Crankshaft), and it is included for Buffered ICEs only.

Compressed Air Tank in Patents: This feature already exists in the patent systems, and it is included as a possibility for Buffered ICEs mainly to drive or feed external devices, claimed only for Buffered ICEs.

Tank Valves in Patents: The main purpose of the Tank Valve is to prevent and if necessary, react to undesired opening of the Tank Valve. Since the pressure inside the tank is normally higher than the cylinders, the best type may be "Outwardly-Opening" poppet. Some patents have valves with similar purpose, but they are significantly different (e.g., U.S. Pat. No. 8,360,019B2, U.S. Pat. No. 8,210,138B2, GB2340881B).

Cylinder and Engine Functions in Patents: In S4S-ICEs, all cylinders execute a single function of the four-stroke cycle: admission, compression-ignition, expansion, and exhaust continuously. In Split Cycle Engines, some (half) cylinders are dedicated to admission-compression of air and the remaining cylinders to the expansion exhaust continuously. Engine braking in these engines is normally done by using vacuum during the intake stroke with throttling valve closed and other methods.

Power Generation with Partial Exhaust Function in Patents: One of the cylinder functions available in Buffered ICEs is power generation with partial exhaust, which means the exhaust valve is closed early before top dead center leaving some exhaust gases in the cylinder for the next cycle. This is done with the purpose of improving the efficiency of the engine. Early exhaust is mentioned in the following patents: Patent 11391198 specifies early closing of the exhaust valve for the split cycle engine and it claims the purpose is to raise the temperature inside the combustion piston. Publication US2022/0154658A1 specifies early opening of the exhaust valve, with the purpose of raising the temperature of "Recuperator", which is a heat exchange device for the split cycle engine it applies to. Publication WO2015013696A1 specifies early opening of the exhaust valve with the purpose of heating up the catalytic converter faster.

Thermal Energy Recovery in Patents: Patent 7823547 split cycle engines from Scuderi has similar (to Buffered ICE) thermal energy recovery but is very complicated because it mixes gas exhaust with cooling liquid in a heat exchanger and it is specified for split cycle engines only. Other patents use a compressed air tank and charge compressed air during braking of the engine and use the compressed air to drive the engine or feed the intake system as kinetic energy recovery.

BRIEF SUMMARY OF THE INVENTION

A Buffered internal combustion engine provides a framework for flexible management by the electronic control module for an optimal operation of the Engine, an example may include a buffered internal combustion engine comprising a main gas storage tank formed of at least one container capable of holding high pressure gases, at least one internal combustion chamber defined by a bore in an engine block with piston slideably disposed therein, a cylinder head having at least one intake valve, one exhaust valve, a fuel admittance, zero or one ignition starter, and a valve controlling the entry and exit of high pressure gas between the main gas storage tank and an internal combustion engine chamber, wherein a conduit couples said valve to main gas storage tank, wherein the space between the piston at top dead center and the cylinder head is minimal, wherein all valves are electronically controlled by the electronic control module, wherein at least one sensor provides control information to the electronic control module, wherein at least one chamber is able to produce and load high pressure gas to the main storage tank, and at least one chamber is able to produce power from the main storage tank's high pressure gas.

Storage Tank embodiment variations may include: the main gas storage tank, the valve and the conduit that couples the main gas storage tank to internal combustion chamber being insulated. The main gas storage tank comprises two or more containers interconnected, with no valve between them. The main gas storage tank is divided into sections, and a valve controlled by the ECM controls the flow between each section. At least one emissions control device is placed within the main gas storage tank. At least one secondary gas storage tank formed of one or more interconnected containers in communication with the main gas storage tank via a valve controlled by the ECM.

Other engine components variations: At least one compressed gas storage tank formed of at least one container, is connected to at least one engine chamber to transfer fluid between said gas storage tank and engine chamber with an additional valve controlled by the ECM. Depending on the components present in the cylinder head for each chamber, the following cylinder types are defined in order of functionality: CT3, CT4, CT1, and CT2. All valves being mechanically controlled. The Crankshaft split in at least two independent sections, wherein each section drives at least one chamber and further comprising a control connection device joining and separating the sections through ECM control. A system within a combustion engine that recovers heat from various other systems utilizing a common media, and uses said media to raise the temperature of the fluid entering the Intake system of the combustion engine.

An example embodiment may include a method of operating a buffered internal combustion engine on gaseous or liquid fuel comprising the following steps repeated continuously until a stop command is received and completed: Evaluating engine conditions. Scheduling engine start if necessary. Setting tank system's current preferred ranges to the optimal pressure levels anticipating a load or speed increase or decrease. Comparing current pressure levels in tank system to preferred ranges and schedule corrective action if necessary. Comparing current speed or load to the desired values, and schedule increase or decrease of power or speed at the optimal efficiency and sensed urgency if required. Scheduling a standby or stop of engine if requested. Reevaluating parameters for a new group of cycles, or event triggers by changing engine process mode if necessary. Assigning a function to each of the chambers, and recalculating parameters. Running the engine as scheduled for the time or number of cycles calculated by executing the functions specified in each active chamber, and operating other engine components.

Functions (Methods) are useful actions that the ECM may execute within the main process above at chamber level (depending on cylinder type), or engine level (combination of functions in chambers and operation of other engine or external components) to fulfill an engine process. Chamber level functions may be further divided in basic and non-basic functions. Engine Level functions illustrate an example of the chamber level functions needed to fulfill the purpose specified. Depending on the situation, ECM may use equivalent variations of the functions or use different functions as needed.

Basic functions at chamber level may include: HPG Generation. Fresh Air Charging. And Power Generation.

Non-Basic functions at chamber level may include: Power Generation with Partial Exhaust. Power Generation with Pre-Loading of Fresh Air. Deactivated. Engine Braking. Engine Braking with Fresh Air Charging. Fresh Air Cooling. Cylinder Warm-Up. CA Tank Fresh Air Charging. CA Tank to HPG Tank Charging. Release HPG from Main Tank to Exhaust.

Functions at engine level may include: Fast Engine Warm-up: (HPG Generation Function+Cylinder Warm-Up Function+one of the Power Generation Functions). Synchronous Operation: (HPG Generation+Fresh Air Charging+one of the Power Generation Functions) to generate the power being demanded by the load at the best efficiency possible. Kinetic Energy Recovery: While engine is being driven by the connected load, execute Fresh Air Charging in all cylinders. There are other options combining engine braking, etc. Stopping engine: Perform Kinetic Energy Recovery and Engine Braking functions if necessary until engine stops and then repositions crankshaft so at least one of the chambers is after TDC, ready for engine restart. Engine Restart: ECM using HPG stored, and opens tank valve of cylinders positioned after TDC to initiate normal process until idle speed is reached, then stays at that speed until a command is received. Standby Functionality: Convenience methods for preparing and executing starting or stopping engine by operator request or automatically based on ECM settings and engine conditions. Asynchronous Operation: This normally happens on a request to increase the power or speed, manual, or identified by sensors (e.g., a slowdown of a car when it enters a hill). ECM uses HPG stored to quickly increase the power or speed until the desired conditions are reached, then it may switch to new synchronous operation levels. CC-Power Level Connection Functionality: Connect/disconnect at the same or different RPM ratios for Engine Block Physical Sections connected to one another by a CC-Power Level Connection. Thermal Energy Recovery: Thermal Energy Recovery System consists of collecting energy (as heat) from Engine Cooling and/or other sources using a common media (normally liquid) and use it mainly to heat up fresh air being fed to the Air Intake System; recovered heat may be used also for other purposes.

BRIEF DESCRIPTION OF THE SEVERAL VIEWS OF THE DRAWING

Engine components indicated are references to parts of the S4S-ICE. When certain components are omitted it is for simplification purposes (e.g., only the spark plug is indicated for the ignition system), or do not apply for the engine design. Other systems (e.g., cooling) and components (e.g., Engine Block) are implicit in drawings. For engine types other than the S4S-ICE, equivalent components are implied. For simplicity, the drawings show a single Engine Block with one or two Engine Block physical sections.

FIG. 1A discloses an example embodiment with the Main Tank as one container.

FIG. 1B discloses an example embodiment with the Main Tank as one container where the left area is smaller in size compared to the right side.

FIG. 1C discloses an example embodiment with the Main Tank as one container.

FIG. 1D discloses an example embodiment with the Main Tank as one container with two sections interconnected and no valve between them.

FIG. 1E discloses an example embodiment of the Main Tank as one container with two Additional Tank Sections connected with control valves.

FIG. 1F discloses an example embodiment with the Main Tank as two containers (sections) joined by an external control valve.

FIG. 1G discloses an example embodiment with the Main Tank as one container split in two sections with an internal control valve.

FIG. 1H discloses an example embodiment with the Main Tank as one container split in two sections with an internal control valve with additional tank sections connected with control valves.

FIG. 1I discloses an example embodiment with the Main Tank as two containers joined with an external control valve with additional tank sections connected with control valves.

FIG. 9A HPG Generation for Spark Ignited BUFFERED ICEs

FIG. 9N Power Generation with Pre-Loading of Fresh Air

DETAILED DESCRIPTION OF THE INVENTION

Figure 1A:
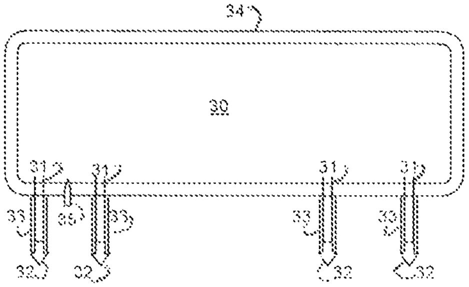
FIGS. 1A to 1I are examples of Tank System embodiments.

In the following description, certain terms have been used for brevity, clarity, and examples. No unnecessary limitations are to be implied therefrom and such terms are used for descriptive purposes only and are intended to be broadly construed. The different apparatus, systems, and method steps described herein may be used alone or in combination with other apparatus', systems, and method steps. It is to be expected that various equivalents, alternatives, and modifications are possible within the scope of the appended claims.

A Buffered Internal Combustion Engine comprises: a Tank System capable of containing high pressure gases (HPG) with connections and valves to all cylinders, an HPG Generation System to feed the Tank System with high pressure gases (HPG) from combustion of air-fuel mixture plus fresh air charged, a Power Generation System that uses the HPG stored in the Tank System to generate power, a system to transmit the net power generated by the engine to drive the load, and an Engine Control Module (ECM) to control all processes. Both HPG and Power Generation Systems may be hosted in a single engine, or they may be hosted separately. The embodiments appearing in this document show a Buffered ICE implementation on a modified S4S-ICE engine hosting both the HPG and Power Generation Systems.

Major differences with a S4S-ICE include: An HPG Tank System with valves to all cylinders included. The cylinder head includes the valve(s) to the tank and depending on the functions that each cylinder will execute. It may include some or all the components as in a S4S-ICE. Refer to "Cylinder Types" below. The "Combustion Chamber" in the cylinder head is replaced by the minimal space possible between the cylinder head and its components with the pistons. It is referred to as "Top Chamber" and all valves electronically controlled by ECM for maximum flexibility (Continuous Variable Valve Timing).

Other Properties of Buffered ICEs may include:

The Buffered ICE described in this document is a "self-sustaining", "power producing" engine. Other variations may include only certain purposes, like HPG Generation, Power Generation, Air/Gas Compressors, etc. for those, variations of the design may be necessary to fit the purpose.

The "Cycle" in this engine is normally two strokes (downwards and upwards) starting and ending at top dead center. A four-stroke cycle may be simulated.

Each group of cycles and each connected piston executes a "function" under ECM control. The basic functions are HPG Generation, Fresh Air Charging, and Power Generation. However, there are many more functions identified.

ECM Controls each Cylinder Function by varying opening and closing timing of valves and assigning operation parameters to valves and other components.

Flexibility: ECM may assign the same function to ALL cylinders, if possible, e.g., when the HPG tank is completely empty, all cylinders may do HPG Generation and Fresh Air Charging Functions, or on emergency acceleration, execute Power Generation Function, or Emergency Braking, etc. This result provides remarkable flexibility of this engine design and operation.

Power Level Connection devices with possible different ratios may be added if engine is divided in two or more engine blocks, or a block is divided in separate physical sections.

Compressed Air Tank System may be included to drive some external devices and for use by the ECM in the engine processes.

A Thermal Energy Recovery System may be included in the engine design.

Thermodynamics Cycle: This new engine design does not follow the classic Otto cycle of S4S-ICEs.

Decoupling of the "HPG Generation" Functions (Admission/Compression-Ignition strokes) from the "Power Generation" Functions (Expansion, Exhaust strokes) is achieved by varying opening and closing timing of valves and operating other components according to the Functions specified.

For all cylinder types, ECM determines for each number of cycles whether the cylinder executes an HPG Generation, a Power Generation, or some other Function.

Synchronous Process: In Internal Combustion Engines, a Synchronous Process means that the output from the engine at any moment corresponds to the "input" being provided at that moment. In most current engine designs, if not all, the process is Single-Cycle Synchronous.

Processes in Buffered Internal Combustion Engines: Process may be Multi-Cycle Synchronous or Asynchronous as needed to optimize engine efficiency and power/torque demands. 1—Multi-Cycle Synchronous Process: when the engine's load is stable, generating the power required by the engine's load at the best possible efficiency by defining Functions to be performed in the engine during a group of cycles. 2—Asynchronous Process: to react quickly to changing conditions by making use of resources stored previously (HPG) for increasing load or speed increase is requested or storing Kinetic Energy as HPG when load is being reduced or operator requests a reduction in speed.

Tank System: Buffered ICEs must include a Tank System. Tank System includes a Main Tank which is formed by one or more interconnected containers able to hold HPGs at the design maximum pressure, zero or more Additional Tank Sections (aka secondary gas storage tank) of one or more interconnected containers attached to the Main Tank with ECM controlled valves, and conduits and valves from the Main Tank to each cylinder. The total size of the Tank System determines the amount of kinetic energy that may be recovered (similar to batteries in an electric or hybrid vehicle). Other variations of Main Tank may split the Main Tank into two or more sections with an ECM control valve for each one. Cylinders are distributed by design between the sections.

Cylinder Types: The components present on the cylinder head of each cylinder may be air intake valve(s), fuel admittance (on the cylinder head with direct fuel injection), ignition starter (if needed, normally together with fuel admittance), exhaust valve(s), and Tank System valve(s). The following Cylinder Types are some of the most useful combinations of components:

Cylinder-Type1: Zero or more cylinders capable of executing HPG Generation Function. For example, air intake valve(s), fuel admittance, ignition starter (if any), and Tank System valve(s). This Cylinder type has no exhaust valve.

Cylinder-Type2: Zero or more cylinders capable of executing Power Generation Functions. For example, exhaust valve(s), and Tank System valve(s). This Cylinder type has no intake valve, no fuel source, and no ignition starter.

Cylinder-Type3: Zero or more cylinders capable of executing HPG and Power Generation Functions. For example, air intake valve(s), fuel admittance (on the cylinder head with direct injection), ignition starter (if any), exhaust valve(s), and Tank System valve(s). This Cylinder type has all standard components.

Cylinder-Type4: Zero or more cylinders capable of executing Power Generation Functions, plus air admittance i.e., air intake valve(s), exhaust valve(s), and Tank System valve(s). This Cylinder type has no fuel source and no ignition starter.

At least one cylinder capable of executing the HPG Generation Function (Cylinder-Type1 or Cylinder-Type3), and one cylinder capable of executing the Power Generation Function (Cylinder-Type2, Cylinder-Type3, or Cylinder-Type4) is required in a Buffered ICE. A single Cylinder-Type3 type cylinder may fulfill this requirement.

ECM Process: A Buffered ICE provides a framework for flexible management by the ECM for an optimal operation of the engine. ECM schedules an increase or decrease of speed and/or power on a running engine by assigning a function and parameters to each cylinder with the basic functions (HPG generation and Fresh Air Charging to raise the Tank System's pressure and one or more of the Power Generation Functions to produce the power desired) at the best possible efficiency. ECM also uses the non-basic functions to balance the power, efficiency, and help execution of other actions, e.g., energy recovery, braking, etc. ECM may assign all cylinders to perform the same function providing great flexibility.

Purpose of the Invention: The main purpose of the invention is to provide an engine design and methods that overcomes the inefficiencies of combustion engines that "single cycle synchronous" process produce, reduce significantly or eliminate the generation of noxious contamination gases (CO and Nitrogen Oxides), provide flexibility of HPG Generation, Power Generation and many other Functions by assigning up to all cylinders to execute the same Function, provide Process Flexibility with "Native" Functions that other engine designs provide with additional equipment, and all this with an engine design that is highly compatible to the proven reliability of the S4S-ICE.

FIGS. 1A to 1I are examples of Tank System embodiments. Component numbers used throughout all the drawings that have a Main Tank are Main Tank 30 for single sections, 30-A, 30-B for multiple sections, Conduits 31, Tank Valves 32, Insulation of Conduits and Tank Valves 33, Insulation of Containers 34, Safety spark plug (if any) 35, Valve between Physical Sections of Main Tank 38MT, Main Tank may include Filtering or Emission Control Device 36, and Valve 38 joins additional Tank Sections 39 to the Main Tank. Not shown or numbered are safety valves. For example, a manual safety valve to send HPG tank contents to the Exhaust System may be included and a final safety valve to open automatically when tank pressures reach the absolute maximum to safely release tank contents to the ambient.

Figure 1B:
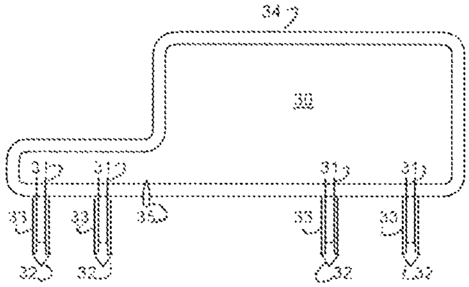
Figure 1C:
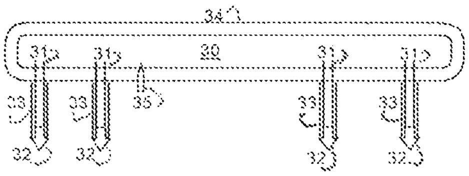

FIG. 1A-1C disclose example embodiments of a Tank System with the Main Tank 30. Conduits 31, tank valves 32, and internal and/or external insulation 33 connect the cylinders to the HPG storage tank. The HPG storage tank 30 may include internal and/or external insulation 34. Safety spark plug 35 (if any) may ignite any unburned fuel received in the HPG storage tank 30.

Figure 1D:
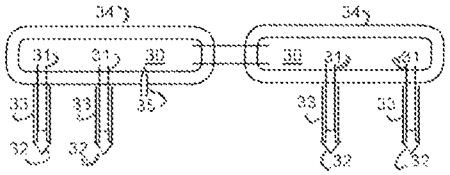

FIG. 1D discloses an example embodiment with the two HPG storage tanks 30 interconnected. In this example embodiment there is no valve between the two HPG storage tanks 30.

Figure 1E:
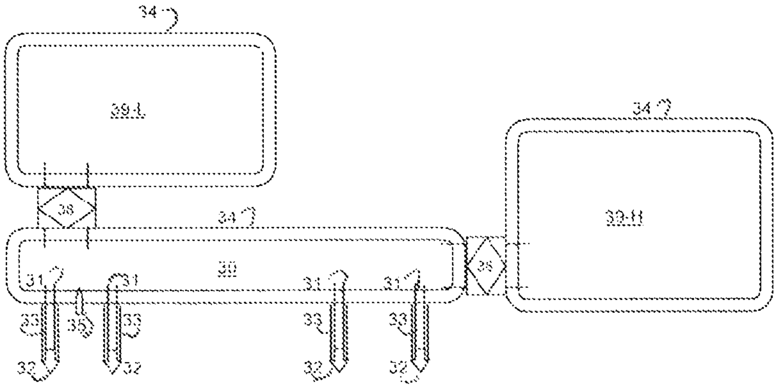

FIG. 1E discloses an example embodiment with the Main Tank as one container with Additional Tank Sections (ATS) connected with control valves. HPG storage tank 39-L is a tank that is maintained at a normally low pressure. HPG tank 39-L is connected to HPG storage tank 30 via an ECM controlled valve 38 that manages the flow between the Main Tank and the ATS. HPG storage tank 39-H is a tank that is maintained at a normally high pressure. HPG tank 39-H is connected to HPG storage tank 30 via an ECM controlled valve 38 that manages the flow between the Main Tank and the ATS.

Figure 1F:
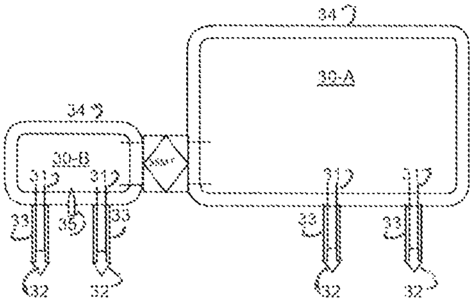

FIG. 1F discloses an example embodiment with the Main Tank as two containers joined by an external control valve. HPG storage tank 30-A is connected to HPG storage tank 30-B via valve 38MT.

Figure 1G:
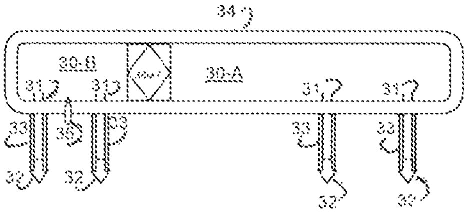

FIG. 1G discloses an example embodiment with the Main Tank as one container with an internal control valve which splits the Main Tank in two sections. In this example HPG storage tank 30-A and storage tank 30-B are connected via valve 38MT, wherein the valve and both storage tanks are stored within a single container.

Figure 1H:
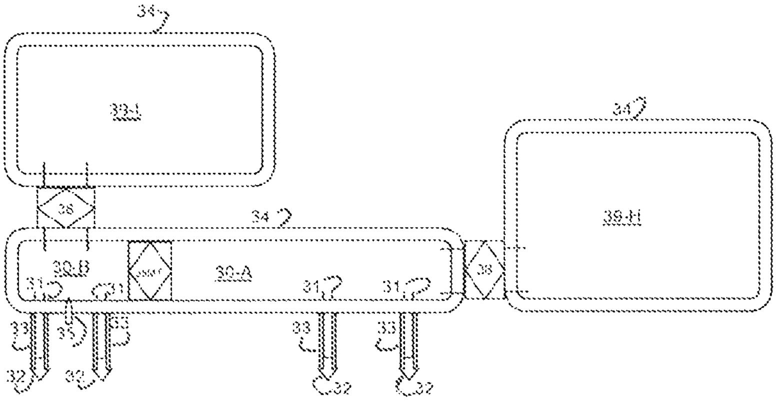

FIG. 1H discloses an example embodiment with the Main Tank as one container with an internal control valve which splits the Main Tank in two sections with Additional Tank Sections connected with control valves. HPG storage tanks 30-B and 30-A are connected to each other via valve 38MT, all within a single housing. Storage tank 39-L is connected to HPG storage tank 30-B via valve 38. Storage tank 39-H is connected to HPG storage tank 30-A via valve 38. FIG. 1H discloses an example embodiment with the normally low-pressure tank 39-L connected to the HPG storage tank 30-A via a first valve 38 and the normally high-pressure tank 39-H connected to the HPG storage tank 30-A via a second valve 38.

Figure 1I:
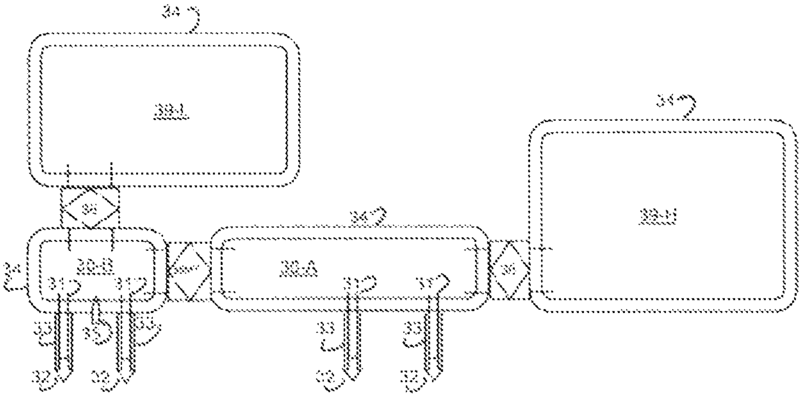

FIG. 1I discloses an example embodiment with the normally low-pressure tank 39-L connected to a storage tank 30-B via a valve 38. The storage tank 30-B is connected to a HPG storage tank 30-A via a valve 38MT. Normally high-pressure storage tank 39-H is connected to the HPG storage tank 30-A via a valve 38MT.

Figure 2:
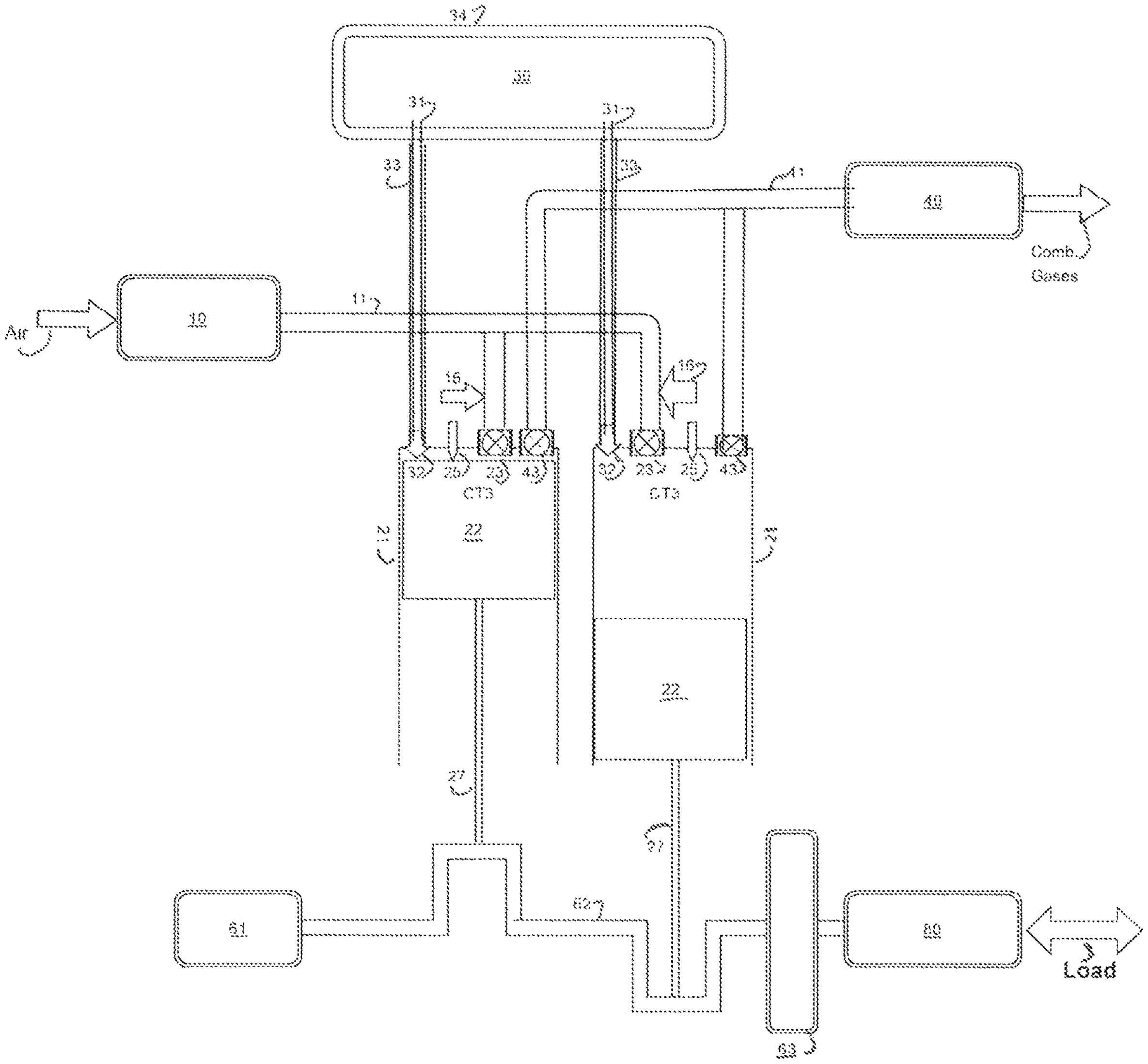
FIG. 2 discloses an example embodiment of new Buffered ICE with Tank System and two Cylinder-Type3 in a Single Engine Block with shared Crankshaft.

FIG. 2 discloses an example embodiment with a Tank System 30, 2 Cylinder-Type3 cylinders, Intake and Exhaust Systems with connections to all cylinders, Fuel Admittance and Ignition Starter System in all cylinders, and Power Level components as follows: Tank System Components: Main Tank 30, Conduits 31, Tank Valves 32, Insulation of Conduits and Tank Valves 33, Insulation of Containers 34, and Safety spark plug (if any) 35. Cylinder Components and related systems: The cylinder head 20, illustrated as the horizontal line on top of the cylinders, where valves and spark plug are mounted. Cylinders 21, Intake System 10, Intake Manifold 11, Intake Valves 23, Exhaust System 40, Exhaust Manifold 41, Exhaust valve 43, Fuel Admittance 16, and Spark plug 25 (nothing else of the ignition system is shown, but it is implied). Pistons 22 slidably disposed therein. Top chamber 26 is the space between the piston 22 and the Cylinder Head 20 when the piston is at top dead center. Power Level Components: Connecting rods 27 join the pistons with the Crankshaft 62, Flywheel 63 smooths the engine rotation, Crankshaft 62 is connected to External Transmission 80, and Engine is started by Starter 61.

Figure 3:
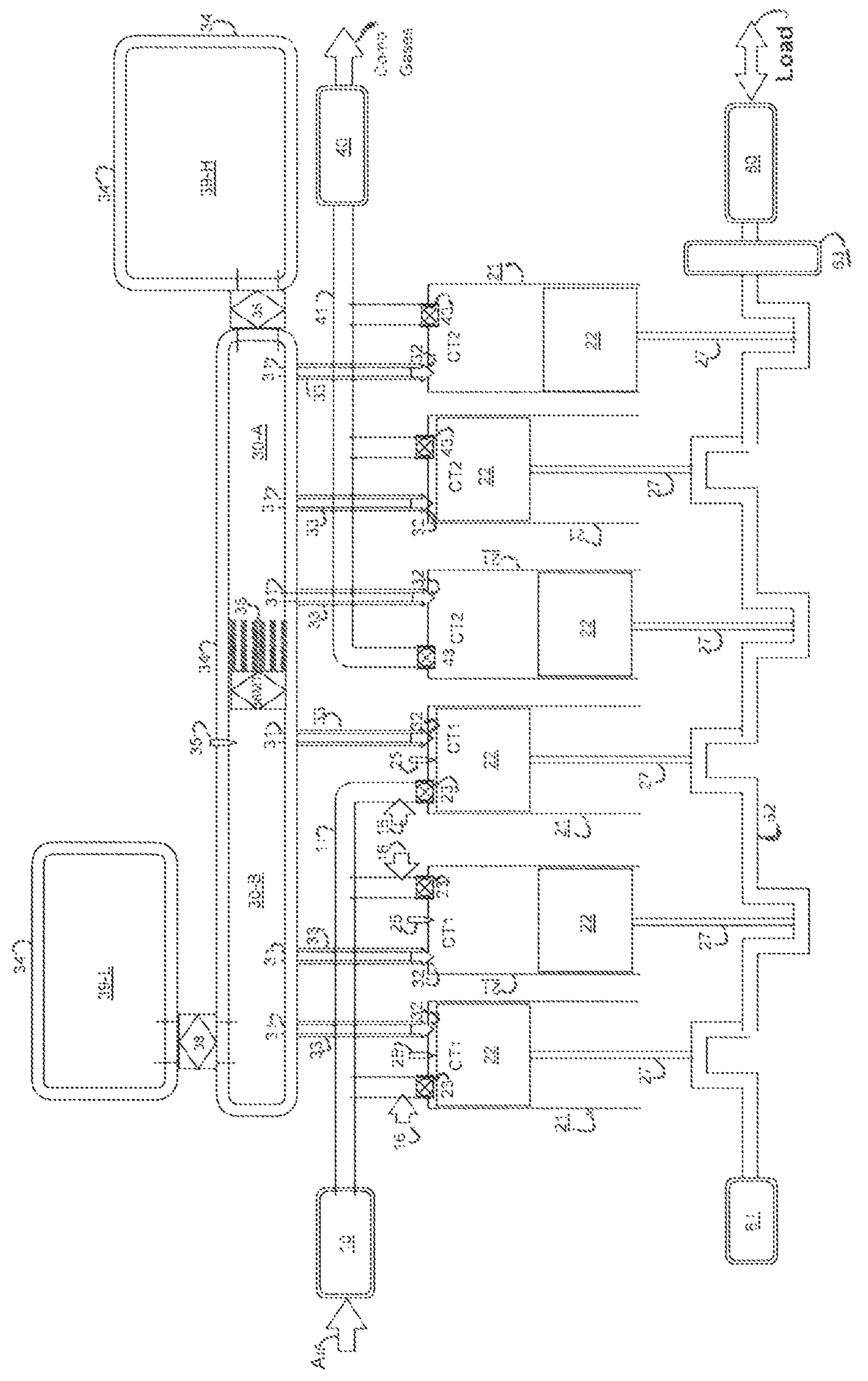
FIG. 3 discloses an example embodiment of new Buffered ICE with Tank System where Main Tank is split in two sections separated by an internal valve, three Cylinder-Type1 and three Cylinder-Type2 cylinders, in a Single Engine Block with shared Crankshaft. This engine design may be appropriate for a Buffered ICE with mechanical valves.

FIG. 3 discloses an example embodiment with a Tank System comprising a single container Main Tank split in two sections 30-A and 30-B defined by an Internal valve 38MT. An Emissions Control Device 36 and Safety Spark Plug 35 are present inside the Main Tank. Two additional tank sections are joined to the Main Tank with valves 38. Three Cylinder Type1 and three Cylinder type2 cylinders 22 are included and connected to the Crankshaft 62 with Connecting Rods 27.

Figure 4:
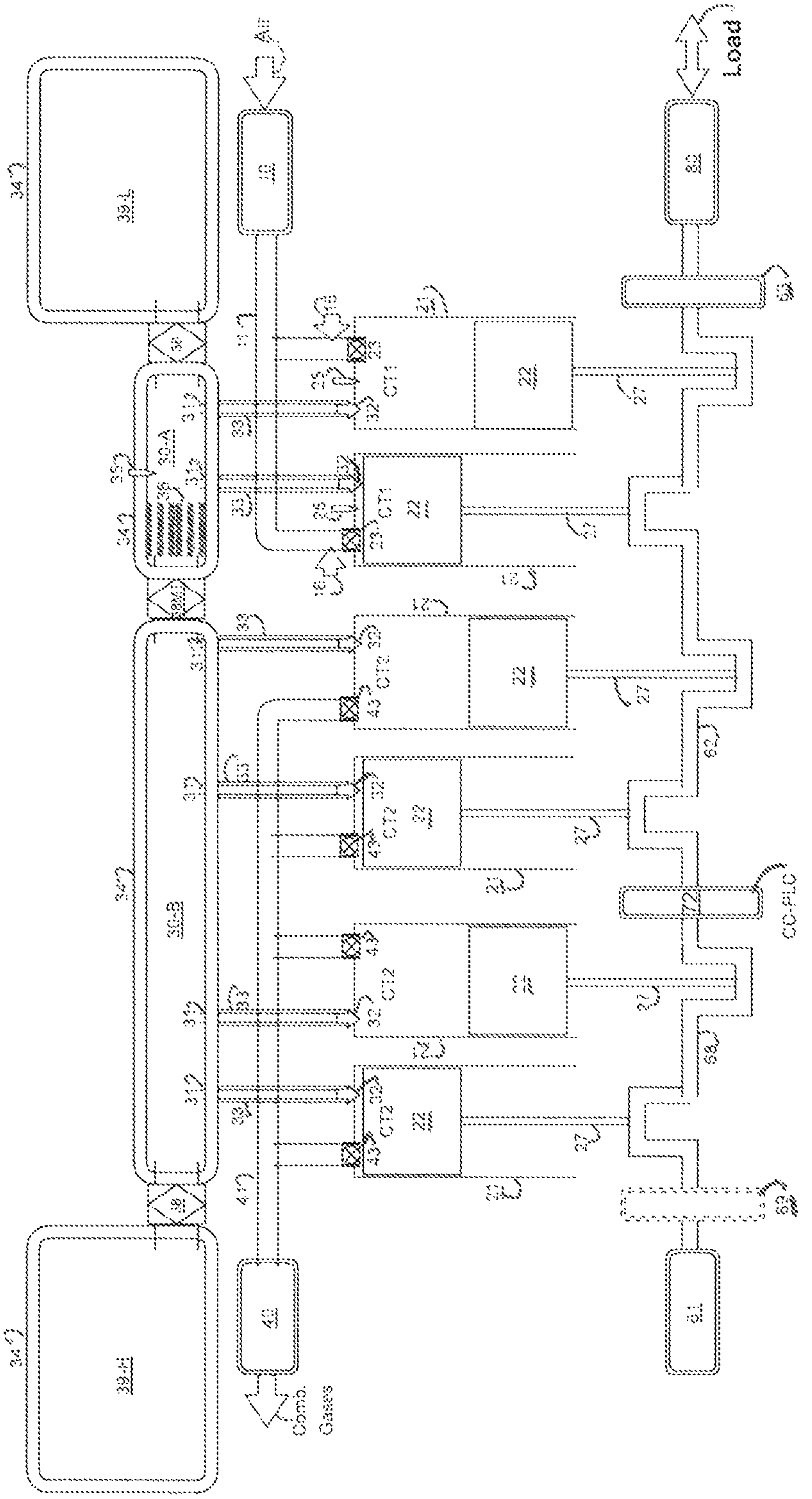
FIG. 4 discloses an example embodiment of new Buffered ICE with Tank System where the Main Tank is split in two sections separated by an external valve, two Cylinder-Type1 and four Cylinder-Type2 cylinders, in a Single Engine Block with Crankshaft split in two sections and a CC type Power Level Connection.

FIG. 4 discloses an example embodiment with a Tank System with a Main Tank comprising two containers (Sections) 30-A and 30-B joined by an External Valve 38MT, an Emissions Control Device 36, and a Safety Spark Plug 35 are present inside the Main Tank. Two additional tank sections are joined to the Main Tank with Valves 38. Two Cylinder Type1 and Four Cylinder Type2 cylinders 22 are included and are connected to the Crankshaft 62 with Connecting Rods 27. Crankshaft is split in two sections with a CC-Power Level Connection Device 72 that allows the leftmost two Cylinder type2 cylinders to be disconnected from the other four cylinders and reconnect them, when necessary, under ECM control.

Figure 5:
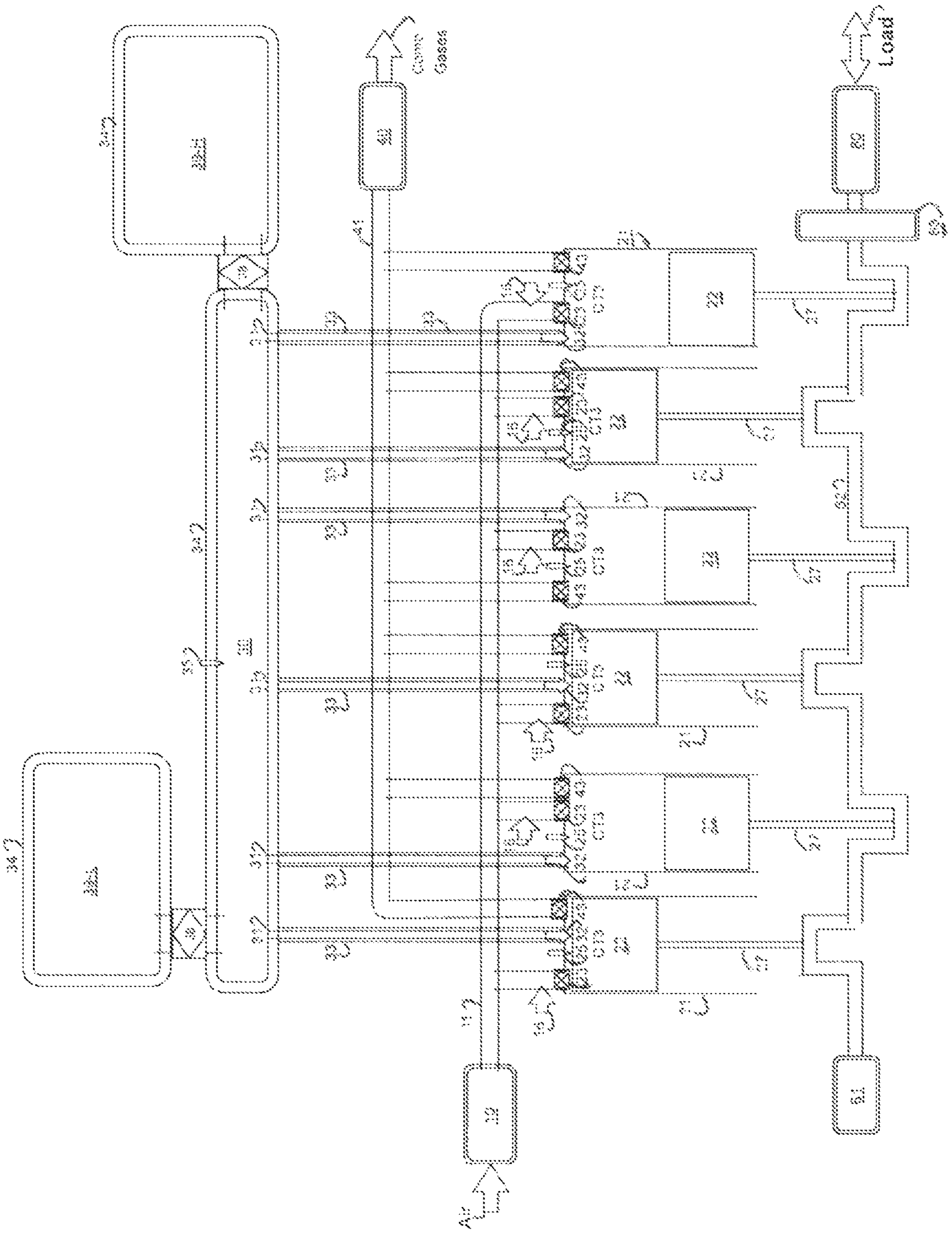
FIG. 5 discloses an example embodiment of a new Buffered ICE with Tank System, six Cylinder-Type3 cylinders, in a Single Engine Block with shared Crankshaft.

FIG. 5 discloses an example embodiment with a Tank System with a Main Tank comprising a Single Container 30 and a Safety Spark Plug 35 is present inside the Main Tank. Two additional tank sections are joined to the Main Tank with Valves 38. Six Cylinder Type3 cylinders 22 are connected to the Crankshaft 62 with Connecting Rods 27.

Figure 6:
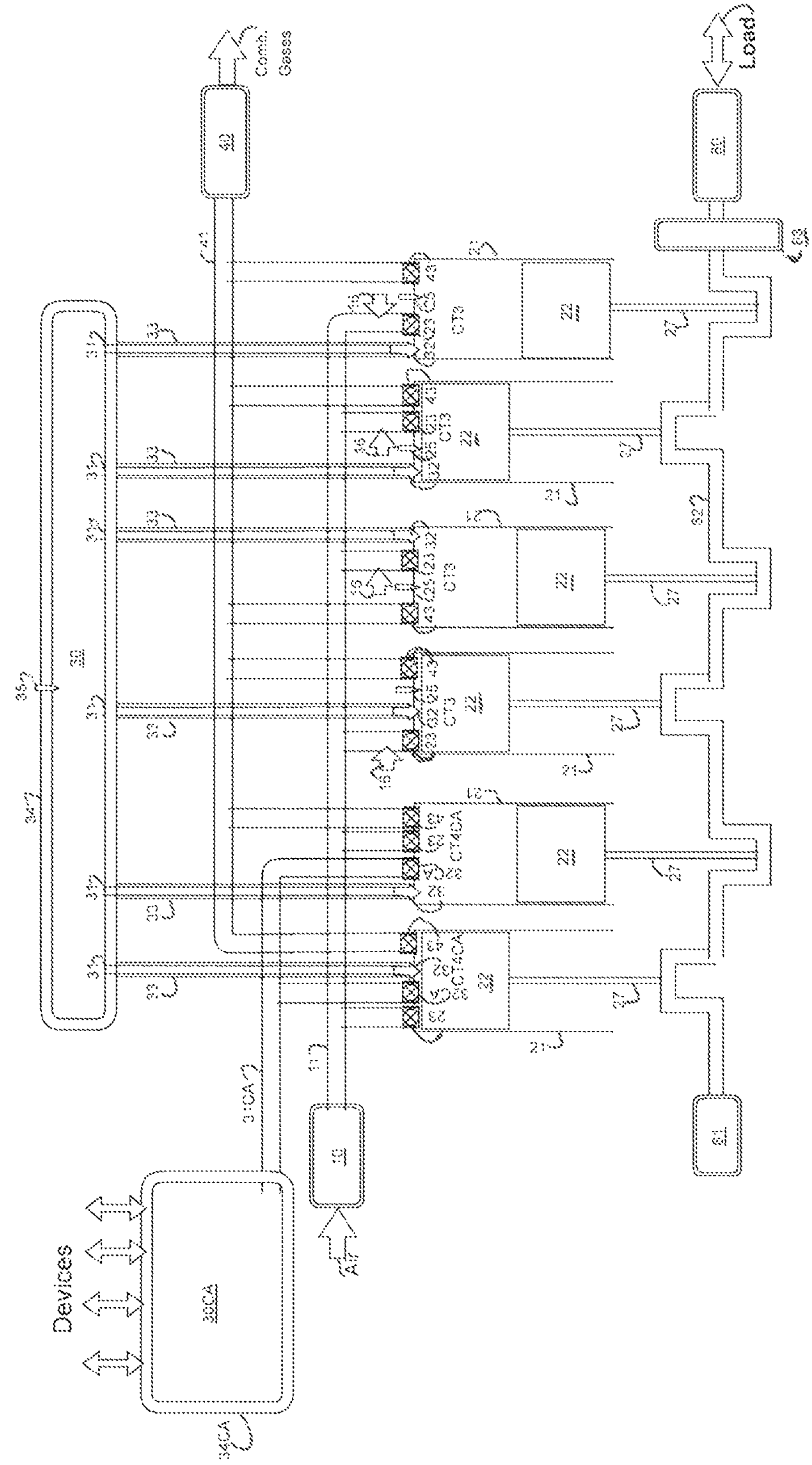
FIG. 6 discloses an example embodiment of new Buffered ICE with Tank System, four Cylinder-Type3 type cylinders, two Cylinder-Type4CA's, and a Compressed Air Tank System in a Single Engine Block with shared Crankshaft.

FIG. 6 discloses an example embodiment of a Tank System with a Main Tank comprising a Single Container 30 and a Safety Spark Plug 35 is present inside the Main Tank. An additional Compressed Air Tank 30CA connects to the two Cylinder Type4CA cylinders with Conduits 31CA and Valves 32CA and four Cylinder Type3 cylinders 22 are connected to the Crankshaft 62 with Connecting Rods 27.

Figure 7:
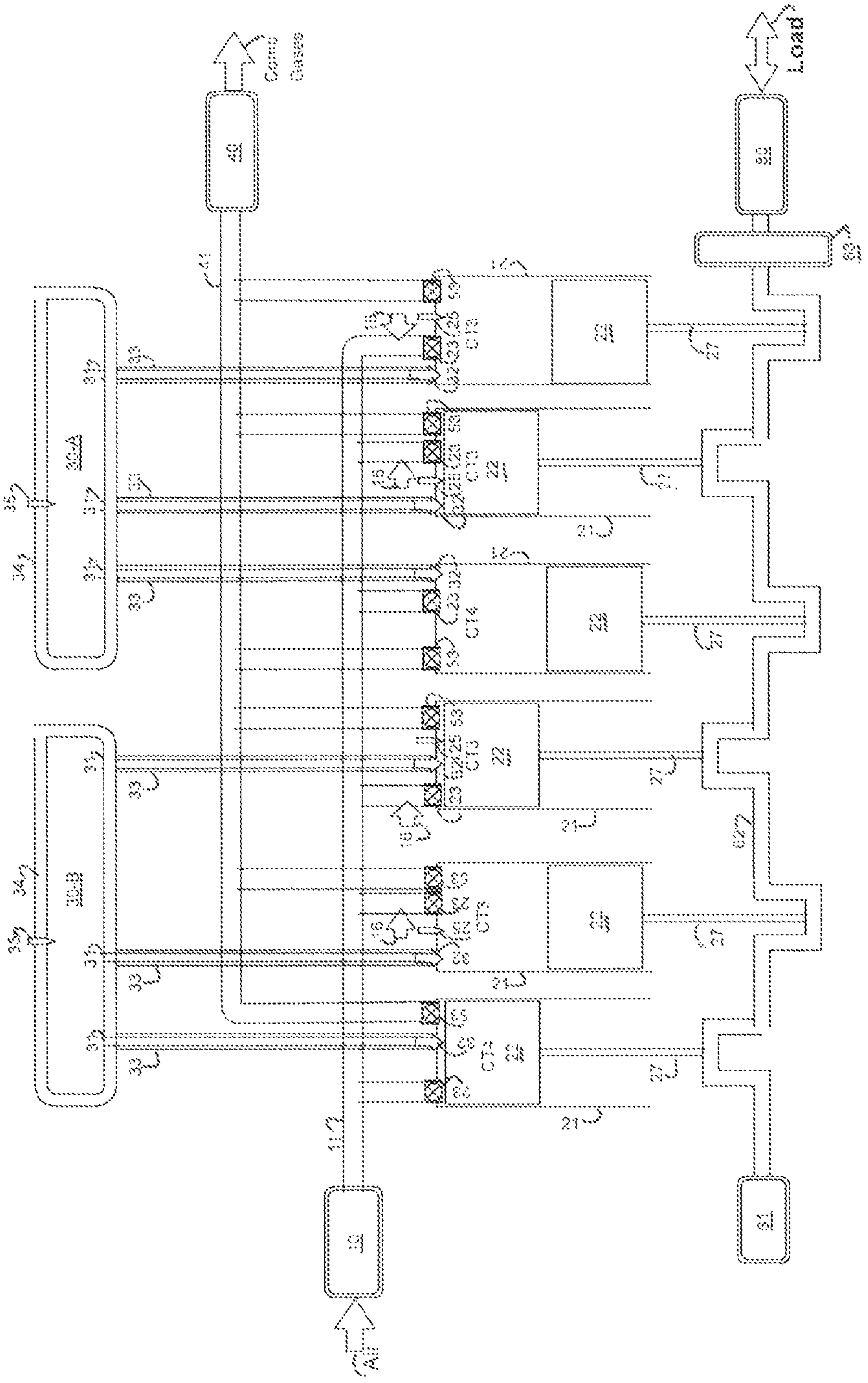
FIG. 7 discloses an example embodiment of new Buffered ICE with two independent Tank System, four Cylinder-Type3, and two Cylinder-Type4 cylinders split evenly in the two Tank System in a Single Engine Block with shared Crankshaft. This is not a recommended configuration.

FIG. 7 discloses an example embodiment of new Buffered ICE with two independent Tank Systems, four Cylinder-Type3 and 2 Cylinder-Type4 type cylinders split evenly in the two Tank Systems, in a Single Engine Block with shared Crankshaft.

Figure 8:
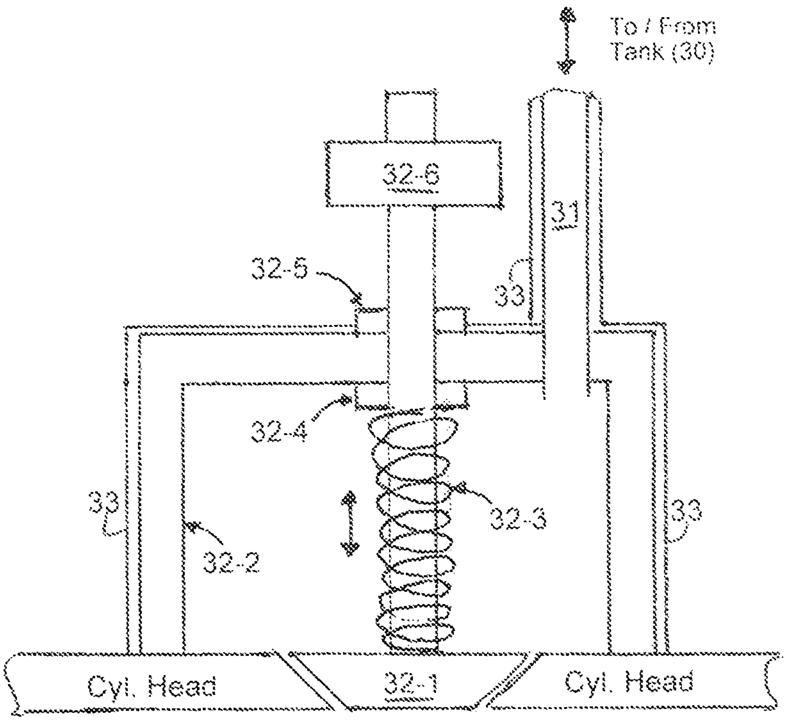
FIG. 8 discloses an example embodiment of a tank valve.

FIG. 8 discloses a functional embodiment of a Tank Valve 32. Conduit 31 transfers gases to and from the Tank System. The Tank Valve 32 includes a Valve Stem 32-1, a Base 32-2, an Optional Spring 32-3, a Locking Mechanism 32-4, a Sensor 32-5 which may include a knock detection sensor or a pressure difference sensor, and a Valve Actuator 32-6. Insulation 33 may be included for the conduit and valve.

Figure 9A:
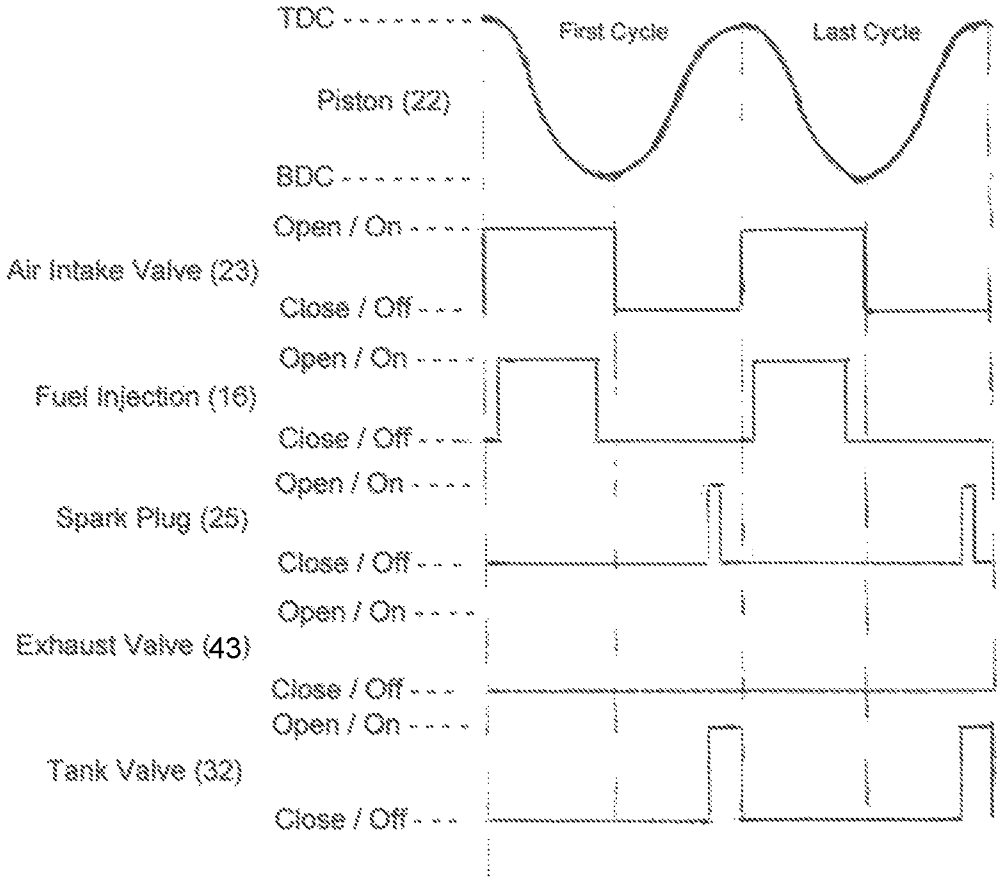
FIG. 9A-9N disclose Process Timing Diagrams of Cylinder Functions available in the disclosed example embodiments.
Figure 9B:
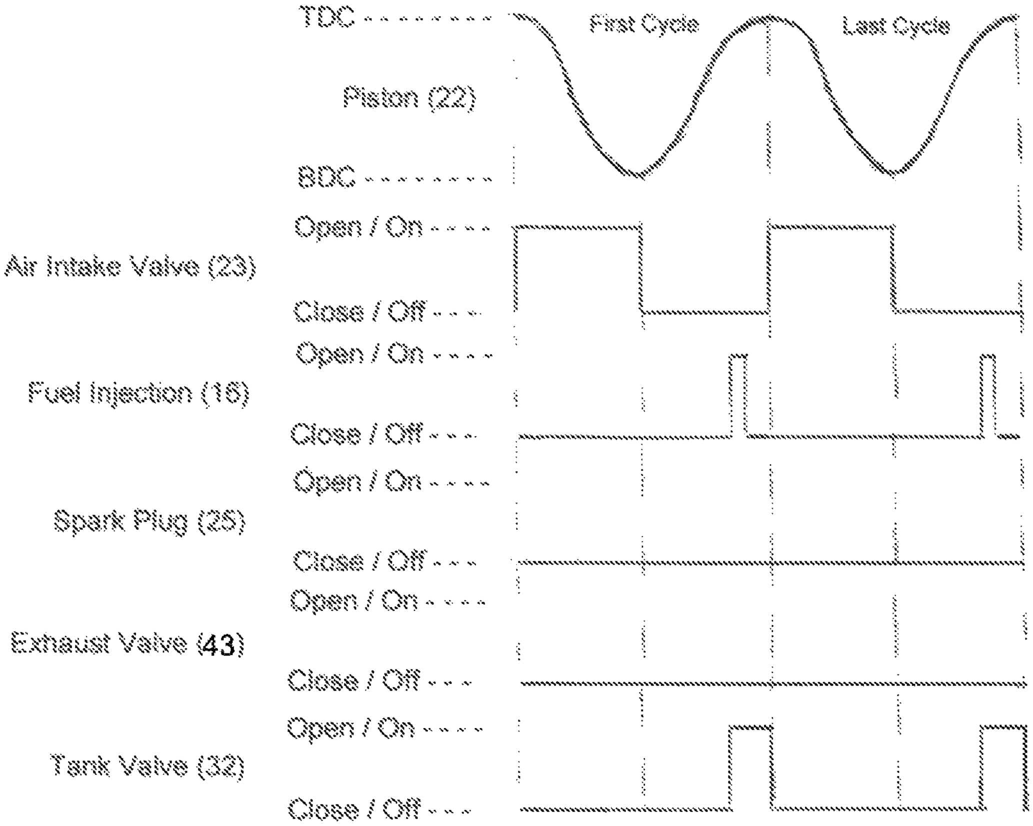
FIG. 9B HPG Generation for Compression Ignited BUFFERED ICEs
Figure 9C:
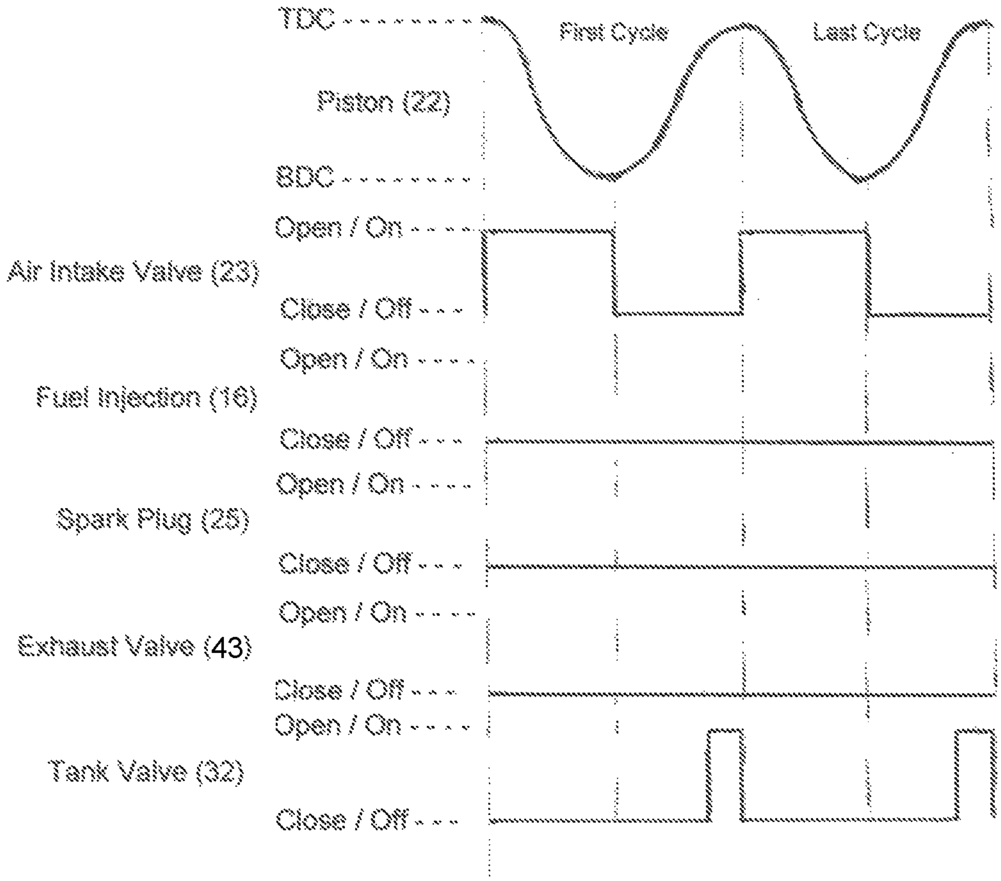
FIG. 9C Fresh Air Charging
Figure 9D:
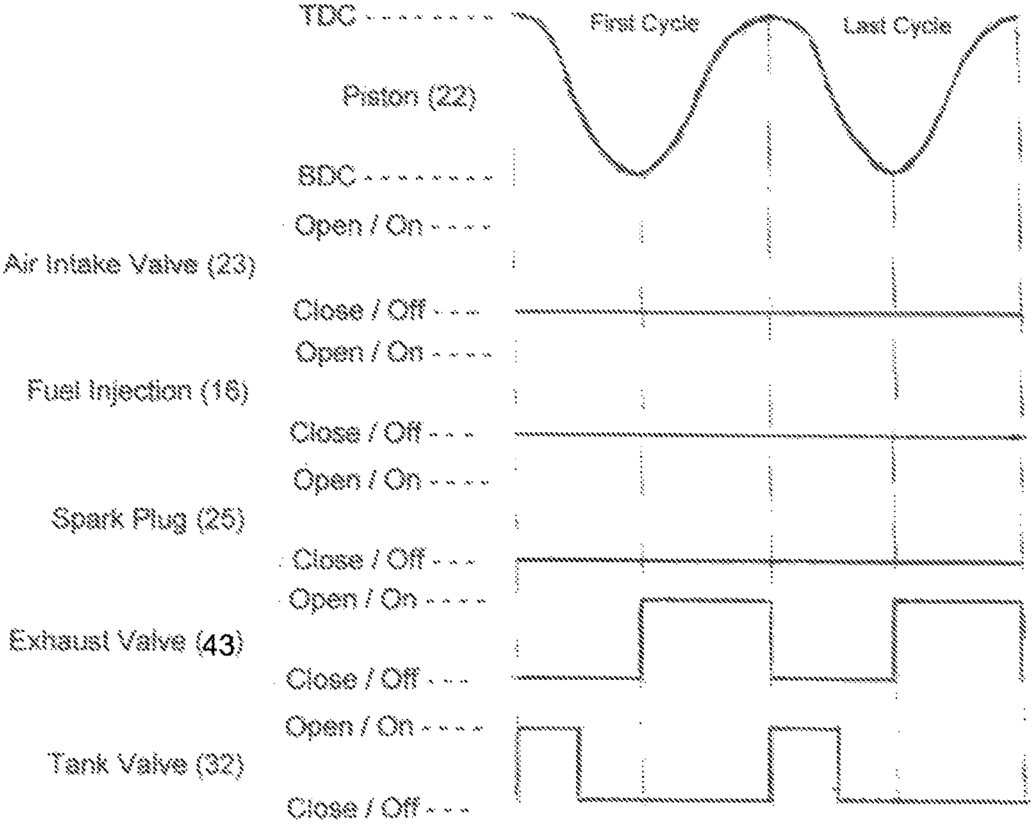
FIG. 9D Power Generation
Figure 9E:
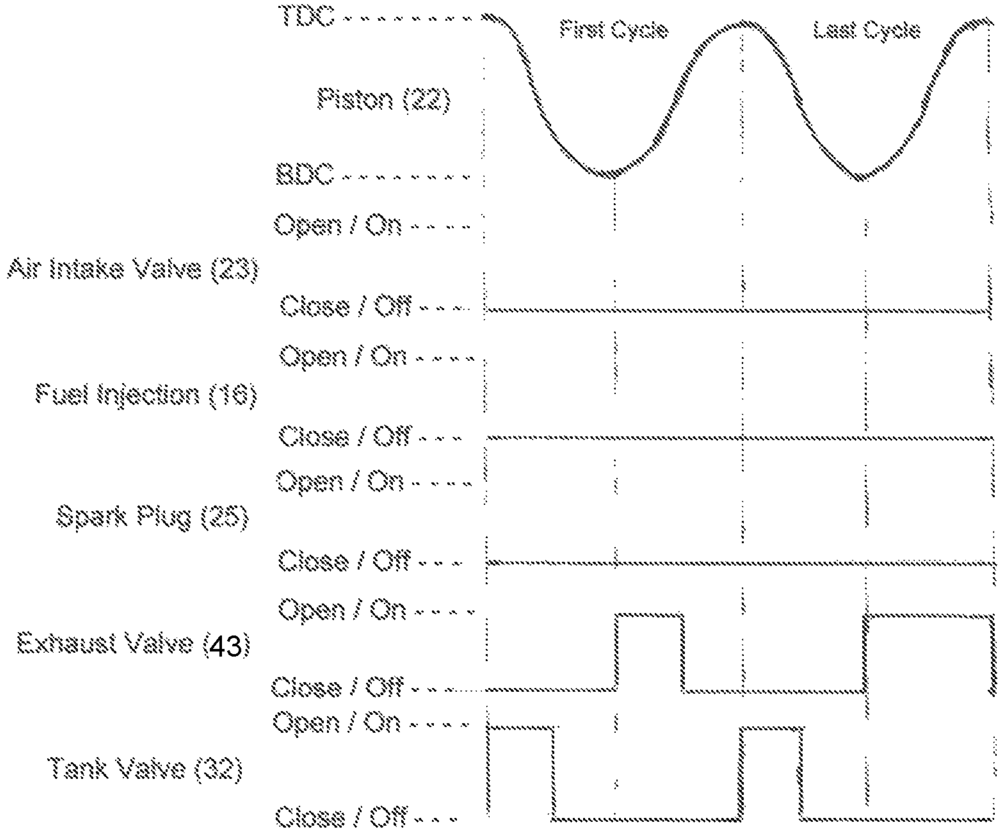
FIG. 9E Power Generation with Partial Exhaust
Figure 9F:
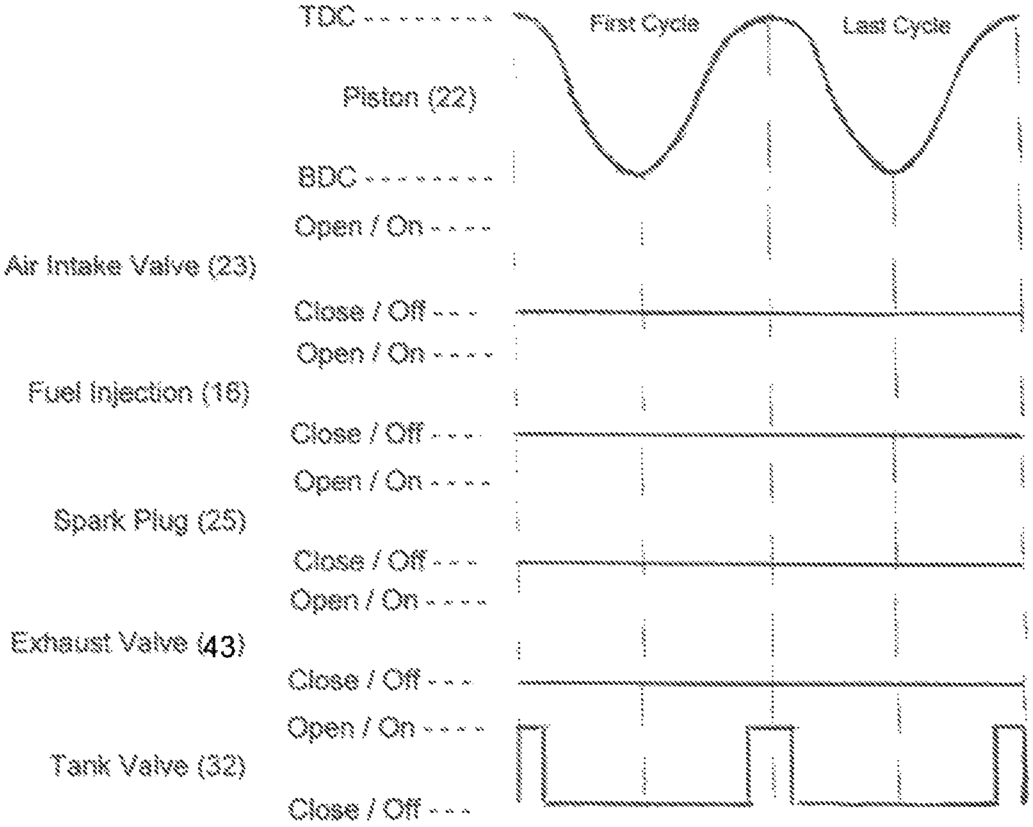
FIG. 9F Deactivated
Figure 9G:
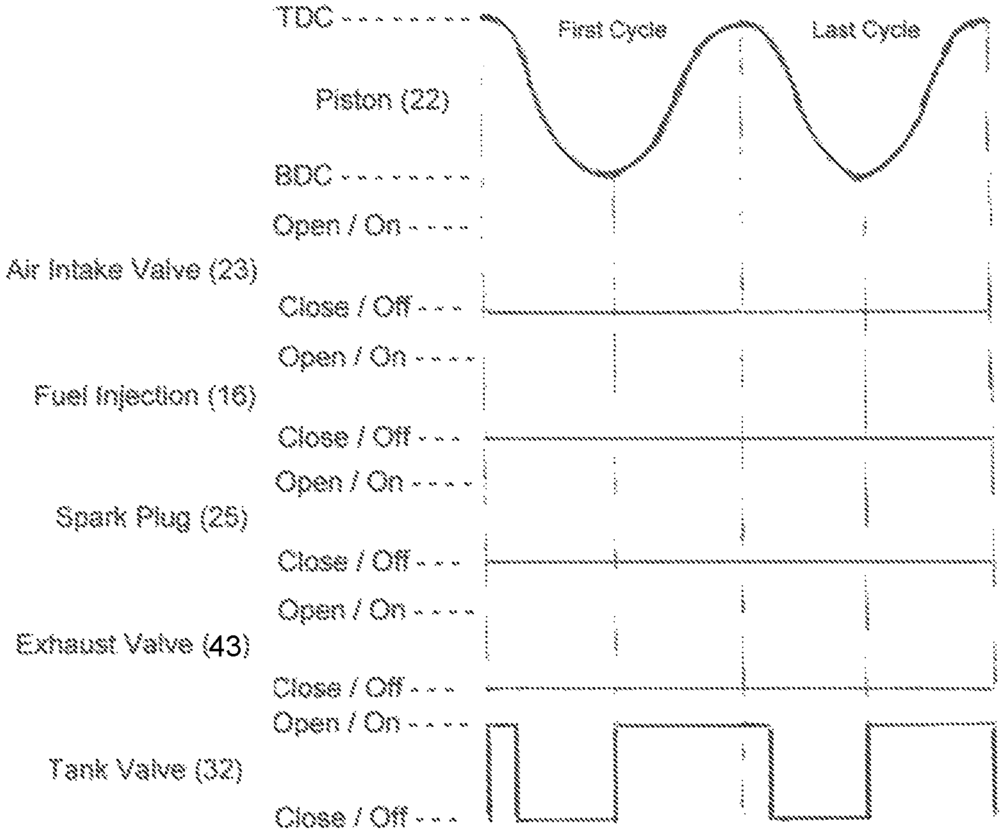
FIG. 9G Engine Braking
Figure 9H:
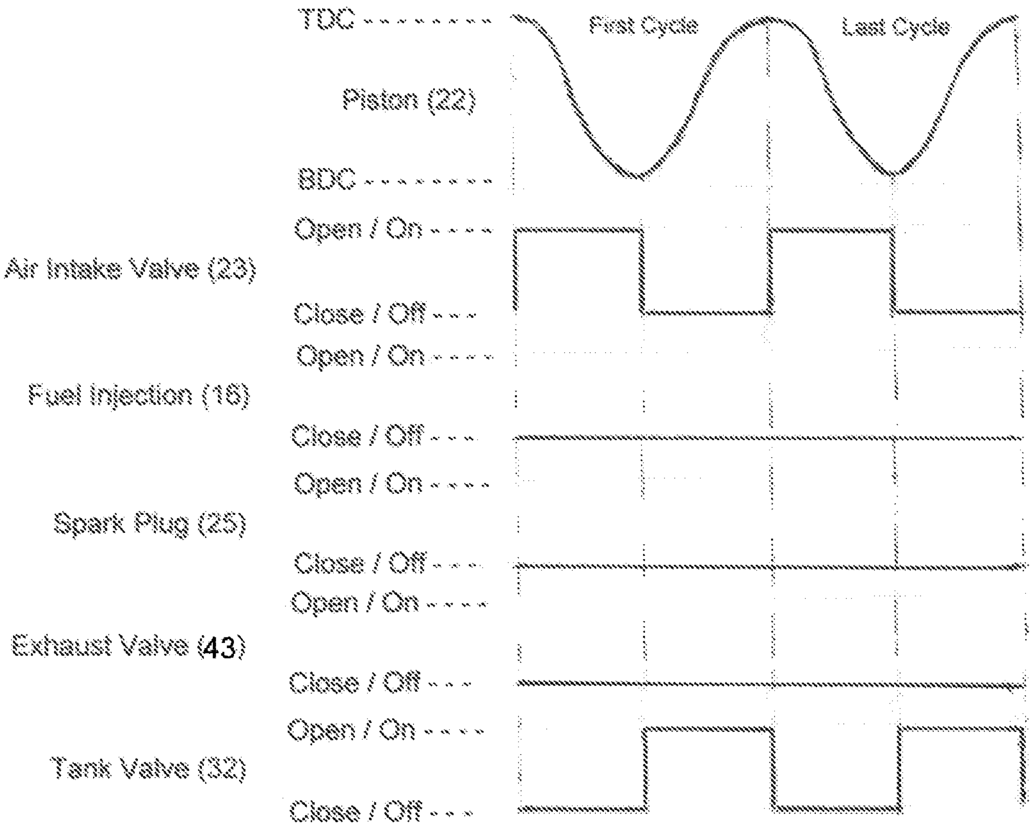
FIG. 9H Engine Braking with Fresh Air Charging
Figure 9I:
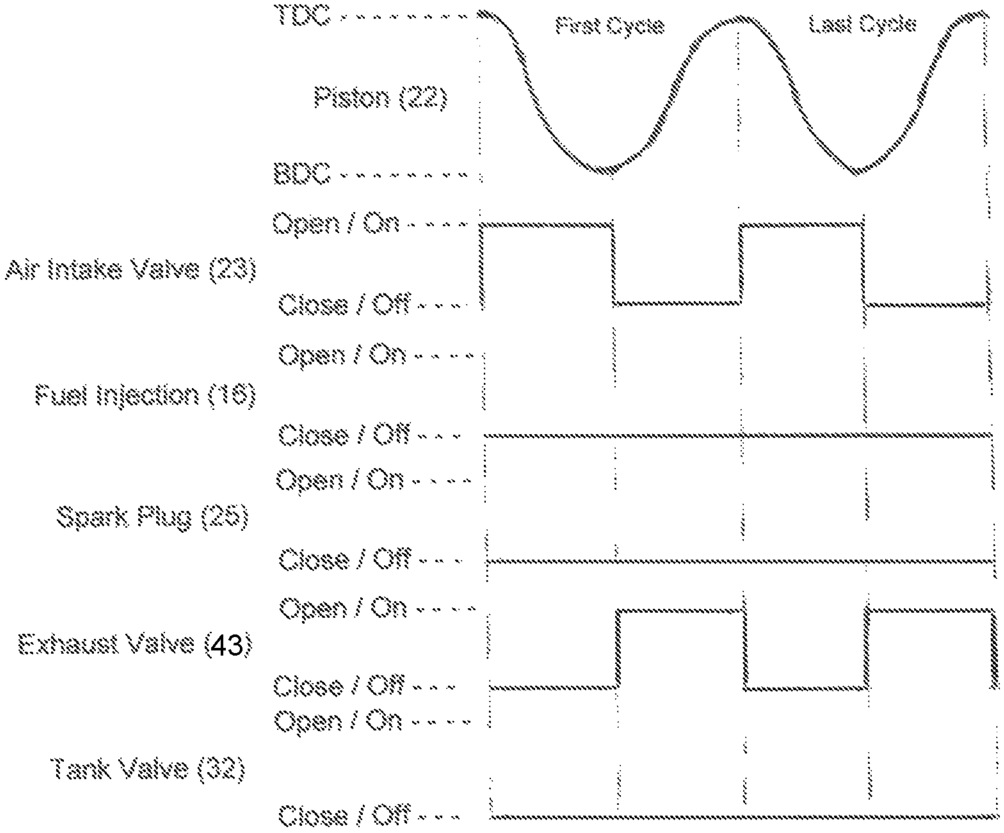
FIG. 9I Fresh Air Cooling
Figure 9J:
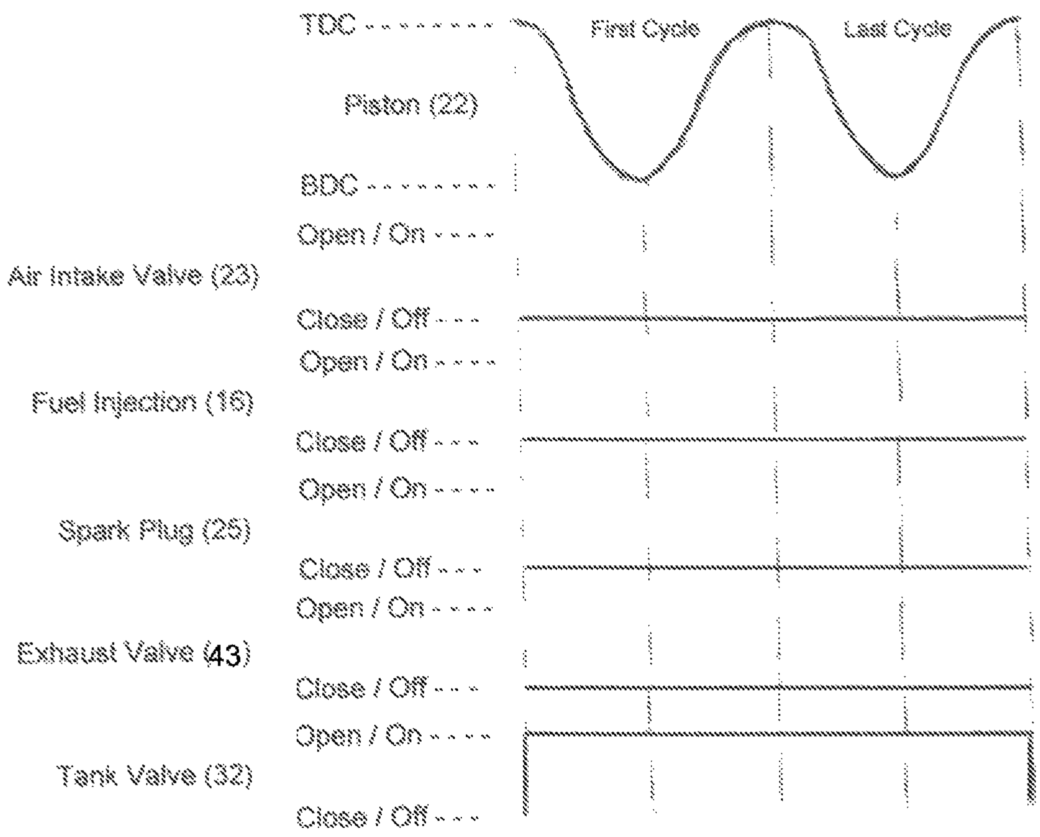
FIG. 9J Cylinder Warm-Up
Figure 9K:
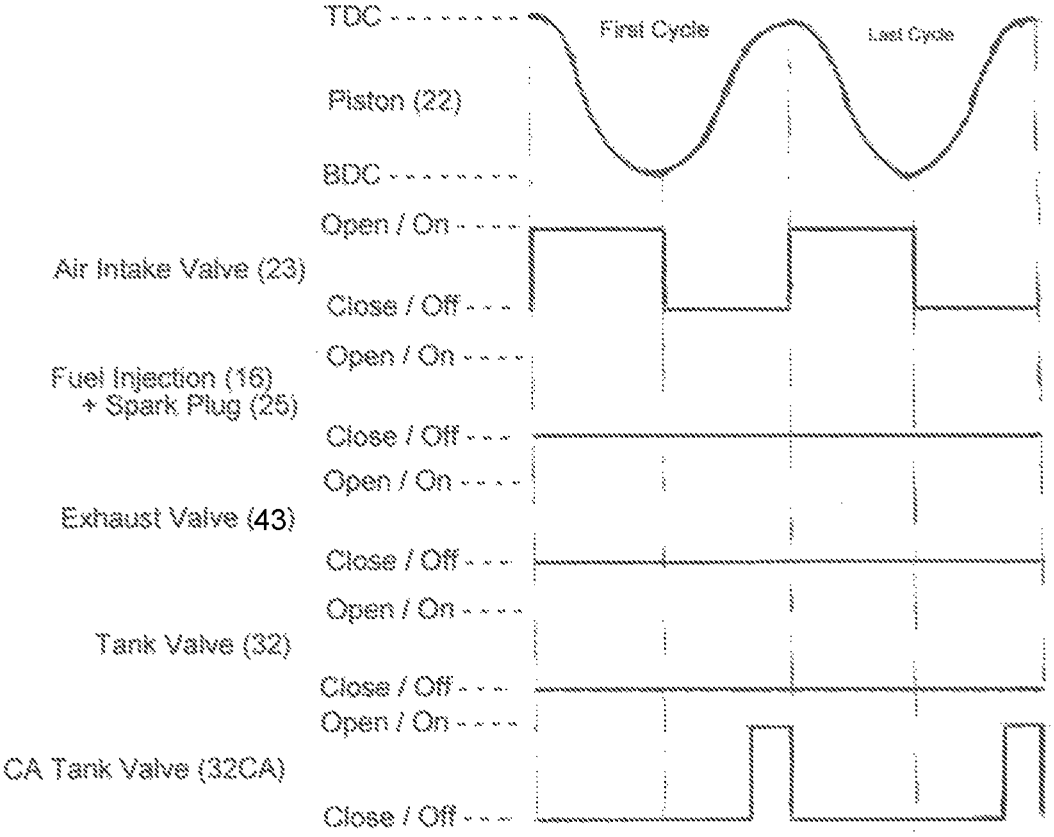
FIG. 9K CA Tank System Fresh Air Charging
Figure 9L:
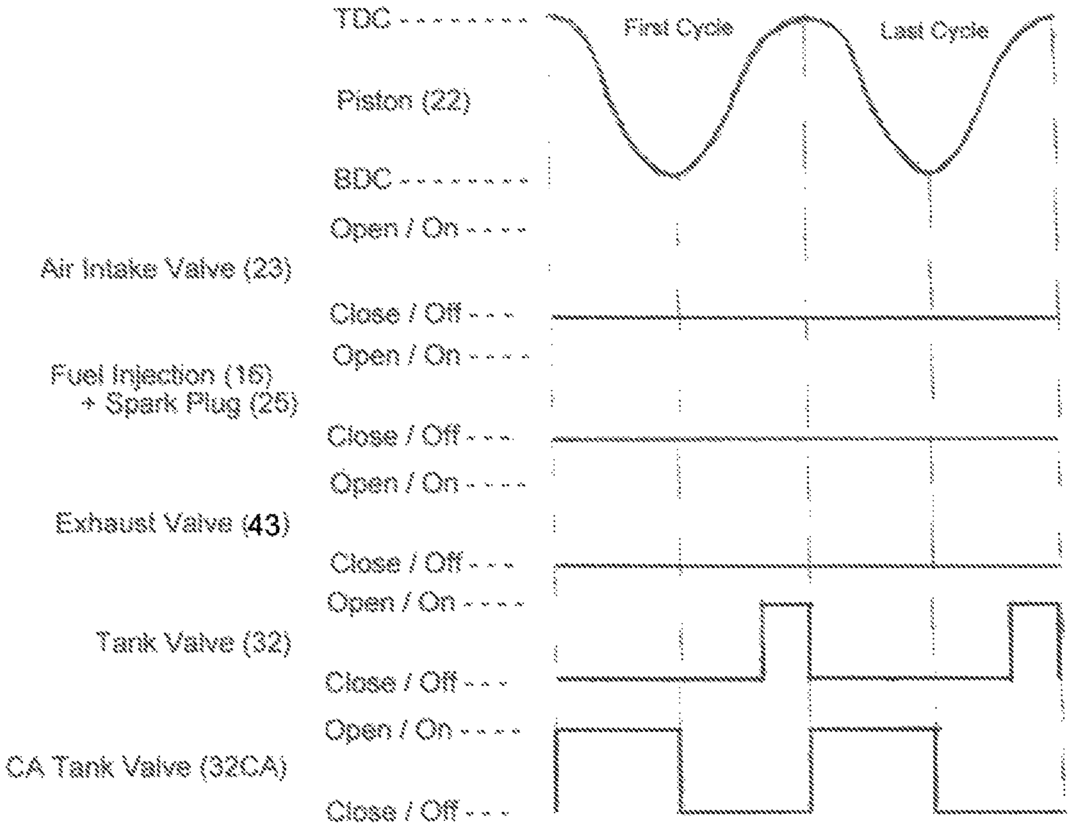
FIG. 9L CA Tank System to HPG Tank Charging
Figure 9M:
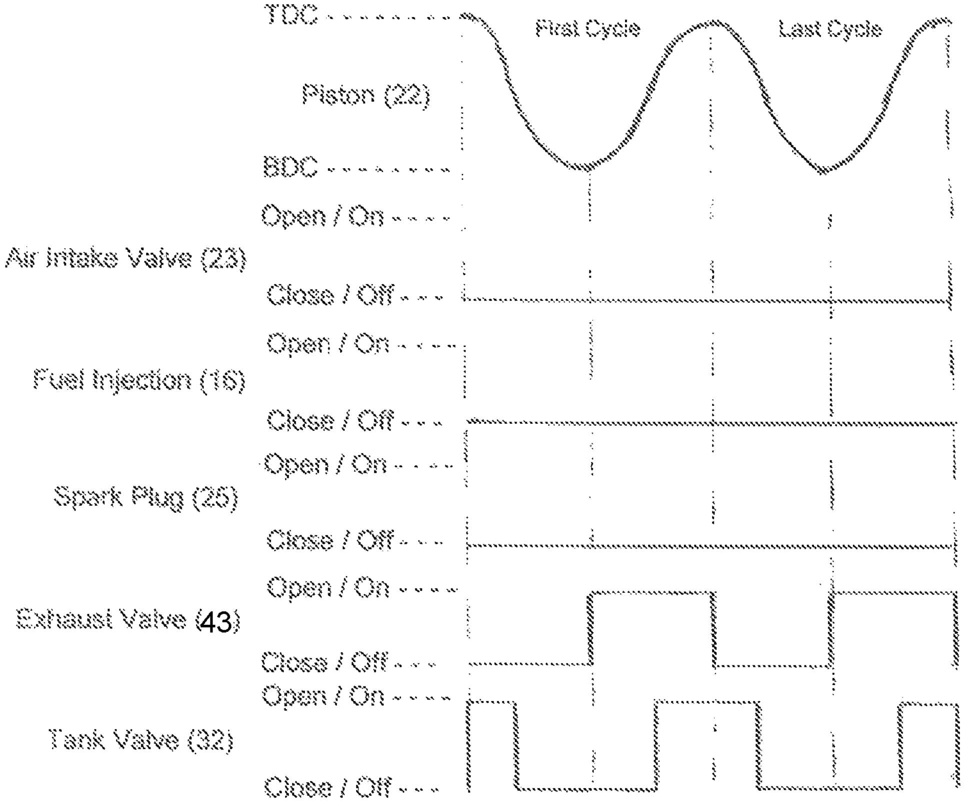
FIG. 9M Release HPG from Main Tank to Exhaust
Figure 9N:
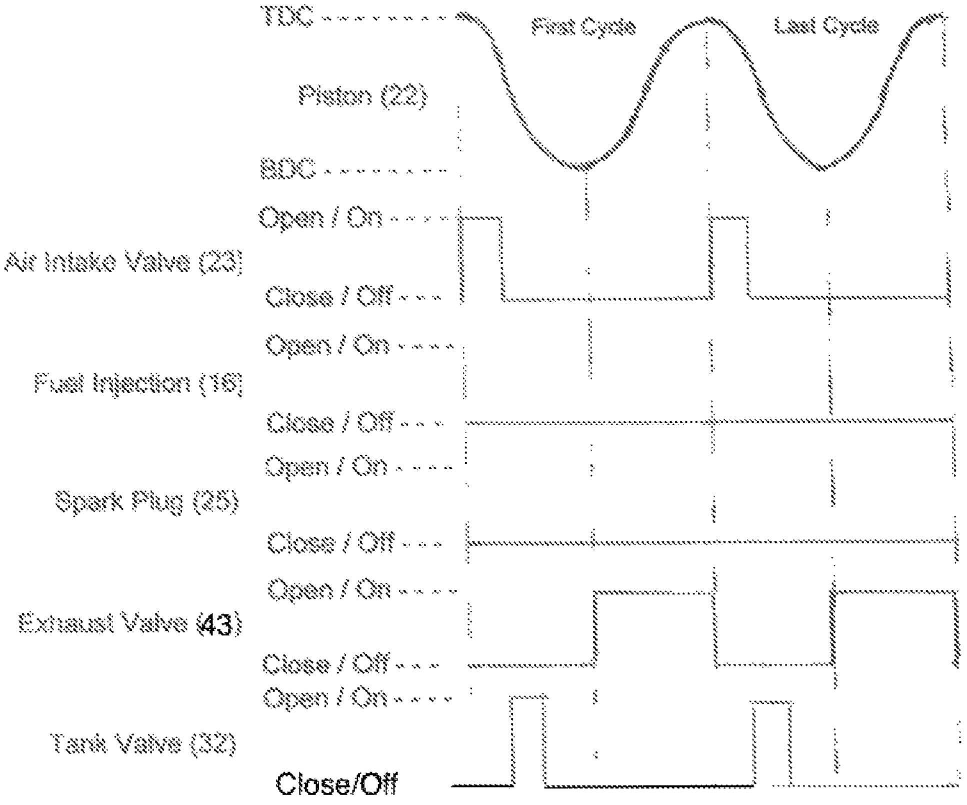

FIG. 9A-9N disclose Process Timing Diagrams of Cylinder Functions used in the disclosed example embodiments. Refer to description in the "Process Timing Diagrams Considerations" and corresponding function.

FIG. 9A HPG Generation for Spark Ignited BUFFERED ICEs

FIG. 9B HPG Generation for Compression Ignited BUFFERED ICEs

FIG. 9C Fresh Air Charging

FIG. 9D Power Generation

FIG. 9E Power Generation with Partial Exhaust

FIG. 9F Deactivated

FIG. 9G Engine Braking

FIG. 9H Engine Braking with Fresh Air Charging

FIG. 9I Fresh Air Cooling

FIG. 9J Cylinder Warm-Up

FIG. 9K CA Tank System Fresh Air Charging

FIG. 9L CA Tank System to HPG Tank Charging

FIG. 9M Release HPG from Main Tank to Exhaust

FIG. 9N Power Generation with Pre-Loading of Fresh Air

Figure 10:
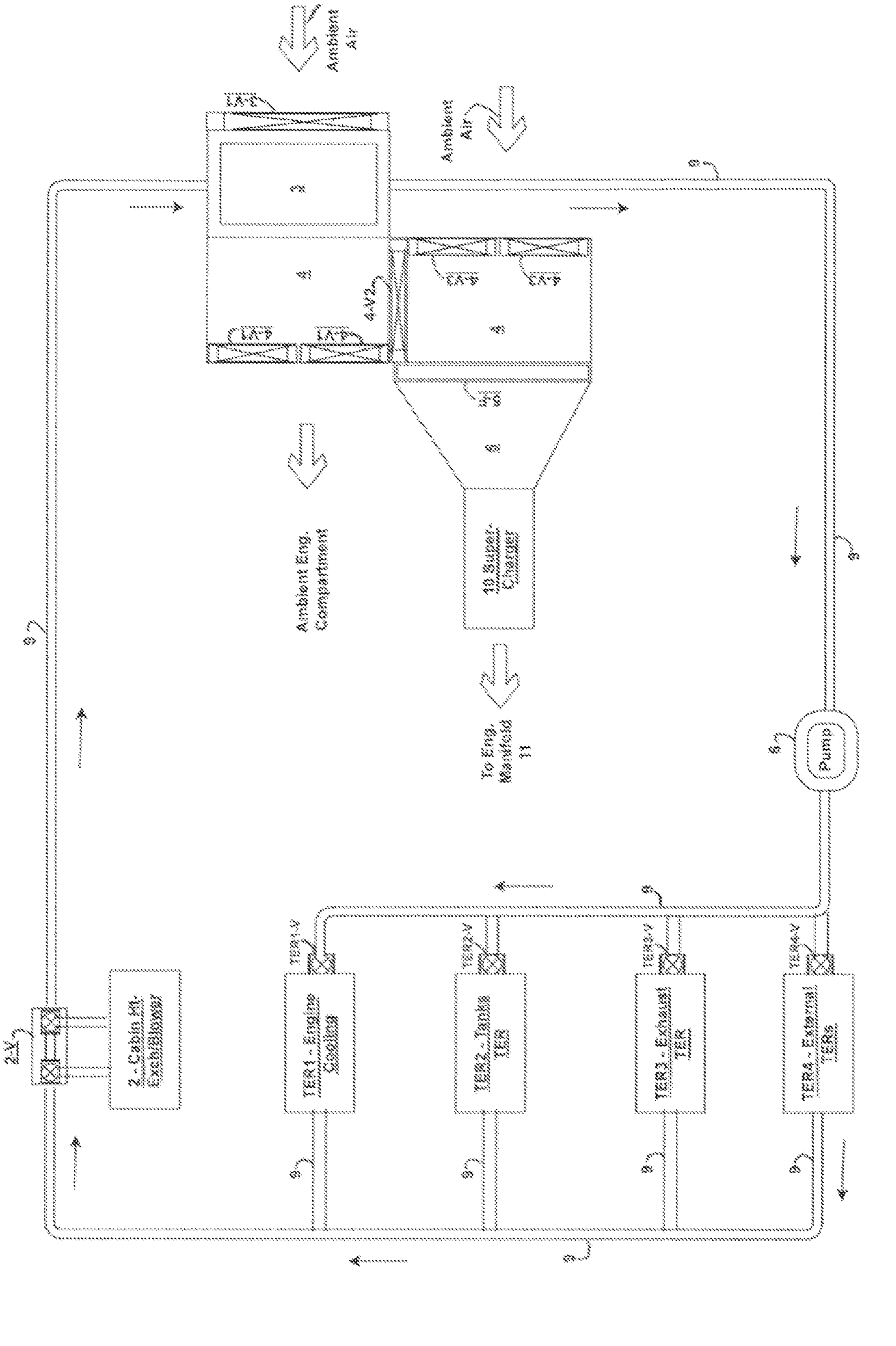
FIG. 10 discloses an example embodiment of a Thermal Energy Recovery System.

FIG. 10 discloses a functional embodiment of a complete Thermal Energy Recovery System. A Thermal Energy Recovery System includes energy capture of at least one source. Since a cooling system is normally used in ICEs it is included in the design and may include one or more of the following sources: TER1—Engine Cooling are the conduits inside Engine Block to let coolant pass through and cool down the engine itself. The valve TER1-V is equivalent to a thermostat used in S4S-ICEs engines. It may include a cabin heat exchanger/blower 2. The valve 2-V routes Coolant to the heater or bypasses it. Radiator 3 dissipates heat to the ambient and/or is routed to the Intake System 10. Pump 6 keeps coolant flowing through liquid lines 9. Heat from sources of Thermal Energy: Energy escaping from Engine (TER1-Engine Cooling), Tanks (TER2-Tanks), Exhaust System (TER3-Exhaust), and External Sources (TER4-External TERs) may be captured into a liquid coolant and be sent for recovery to the radiator and/or other uses like the vehicle cabin as heat. Valves (TER1-V, TER2-V, TER3-V, TER4-V, etc.) may need to be controlled by the ECM based on values from additional temperature sensors (not shown), to obtain the maximum efficiency and energy recovery possible, keeping operating engine at optimal values. ECM can open, close, and in some cases partially open the valves as necessary. The Radiator 3 may have a valve 3-V1 to control the ambient air volume that goes through the radiator. Thermal Energy Recovery Control Box 4 allows the heated air from the radiator to be sent as input to the Intake System 10 (which may include a supercharger), to be dissipated to the ambient, or a combination of the two. Full energy recovery mode occurs when four V1 valves are closed, four V2 open, and four V3 are closed. No energy recovery mode occurs when four V1 valves are open, four V2 are close, and four V3 are open. Partial energy recovery mode occurs when all valve positions are adjusted per sensor values and ECM calculations. Intake Air Filter Adapter 5 includes the Air Filter Element 5-F. Liquid lines 9 may be insulated, especially in cold weather areas.

BRIEF DESCRIPTION OF THE SEVERAL FUNCTIONS: Functions are considered equivalent to "Methods".

CYLINDER LEVEL FUNCTIONS: Useful combination of actions by ECM in each cylinder by opening and closing valves and operation of other cylinder components in a cycle beginning and ending at top dead center.

BASIC CYLINDER LEVEL FUNCTIONS: Similar to processes in Split Cycle Engines, Buffered ICE cannot operate without these Functions. Examples may include HPG Generation: Generation and loading of HPG from air-fuel combustion to Tank System. Available on embodiments with cylinders having an Intake Valve, Tank Valve, fuel admittance, and ignition starter (if any). Refer to FIGS. 2-7. Examples may include Fresh Air Charging: Loading of fresh air to Tank System. Available on embodiments with cylinders having an Intake Valve and Tank Valve. Considered as basic because of its advantages. Refer to FIGS. 2-7. Example may include Power Generation: Generation of power and torque by consuming HPG from Tank System. Available on embodiments with cylinders having an Exhaust Valve and Tank Valve. Refer to FIGS. 2-7.

NON-BASIC CYLINDER LEVEL FUNCTIONS: Buffered ICE Design allows other functionalities to be implemented at cylinder level as follows:

Power Generation with Partial Exhaust: Similar to "Power Generation" above but keeping a portion of HPG in cylinder for next power cycle. Available on embodiments with cylinders having an Exhaust Valve and Tank Valve. Refer to FIGS. 2-7.

Power Generation with Pre-Loading of Fresh Air: Similar to "Power Generation" above but with pre-loading of fresh air before opening of Tank Valve. Available on embodiments with cylinders having an Intake Valve, Exhaust Valve, and Tank Valve. Refer to FIGS. 2, 5-7.

Deactivated: Operation of cylinders does not consume HPG and the energy loss by cycling of the cylinders is mainly the friction losses. Available on embodiments with cylinders having a Tank Valve (All cylinders). Refer to FIGS. 2-7.

Cylinder Warm-Up: HPG is cycled through the cylinder, but the HPG is charged back to the Tank System. Available on embodiments with cylinders having a Tank Valve (All cylinders). This Cylinder Level Function is used during a cold engine start under the "Fast Engine Warm-Up" Engine Level Function. Refer to FIGS. 2-7.

Release HPG from Main Tank to Exhaust: This Cylinder Level Function may be used mainly in a maintenance shop from a control device to release the Tank System's contents to the exhaust system for tank repairs, changes, etc., but it is available to the ECM to be used during exceptions or emergencies. Available on embodiments with cylinders having an Exhaust Valve and Tank Valve. A Tank Safety Valve may be available to do something similar manually. Refer to FIGS. 2-7.

Engine Braking: Opposing power is created in the cylinder by using HPG to reduce speed, but the HPG is charged back to the Tank System. Available on embodiments with cylinders having a Tank Valve (All cylinders). Refer to FIGS. 2-7.

Engine Braking with Fresh Air Charging: Same as above but opening the air Intake Valve during the downwards stroke. Available on embodiments with cylinders having an Intake Valve and Tank Valve. Refer to FIGS. 2-7.

Fresh Air Cooling: Helping to cool down the cylinder by letting fresh air from Intake Valve cycle through the cylinder to the exhaust system. Available on embodiments with cylinders having both Air Intake and Exhaust valves. Refer to FIGS. 2, 5-7.

CA Tank System Fresh Air Charging: This Cylinder Level Function is available on embodiments with cylinders having an Intake Valve and a CA Tank Valve. This Function is executed when the ECM has determined it is necessary to recharge the CA Tank. Refer to FIG. 6.

CA Tank System to HPG Tank Charging: This Cylinder Level Function is available on embodiments with cylinders having a CA Tank Valve and a Tank Valve. This Function is executed when the ECM has determined it is necessary to retrieve some of the CA Tank's contents and charge them to the Main Tank on an emergency basis, or for any other purpose. A CA Tank dedicated only to driving engine devices may restrict returning of compressed air. Refer to FIG. 6.

ALTERNATING OF CYLINDER LEVEL FUNCTIONS: Alternating functions being done in cylinders by the ECM may be possible based on cylinder type. Some advantages of "alternating" are better engine cooling and more uniform cylinder wear.

COMBINED CYLINDER LEVEL FUNCTIONS: Useful combination of Cylinder Level Functions by ECM in all cylinders to produce a desired objective. Examples may include Fast Engine Warm-up: (HPG Generation Cylinder Level Function+Cylinder Warm-Up Cylinder Level Function+one or more of the Power Generation Cylinder Level Function). Refer to FIGS. 2-7. Synchronous Operation: (HPG Generation+Fresh Air Charging+one or more of the Power Generation Functions) to generate the power being demanded by the load at the best efficiency possible. Refer to FIGS. 2-7. Kinetic Energy Recovery: While engine is being driven by the connected load, execute Fresh Air Charging in all cylinders. There are other options combining braking, etc. Buffered ICEs convert the Kinetic Energy of the engine and/or vehicle into HPG and store it in the Tank System, then use the HPG stored to convert it back to movement by the Power Generation System. Refer to FIGS. 2-7.

ENGINE LEVEL FUNCTIONS: These are similar to Combined Cylinder Level Functions, except that other components of the engine or vehicle may participate to fulfill the objective. Example engine level functions may include Stopping and Restarting Engine from Tank's contents, includes stopping and restarting engine. Refer to FIGS. 2-7. It may include Standby Functionality: Convenience methods for temporarily preparing and/or executing starting and stopping engine by operator request or automatically based on engine conditions. Refer to FIGS. 2-7. It may include Asynchronous Operation: This normally happens on a request to increase or decrease the power or speed, manual, or identified by sensors (e.g., a slowdown of a car when it enters a hill). Depending on the request, tank conditions and many other factors, ECM determines what Functions to execute and parameters to use. Refer to FIGS. 2-7. It may include CC-Power Level Connection Functionality: Connect/disconnect at the same or different RPM ratios for Engine Block Physical Sections connected to one another by a CC-Power Level Connection. Refer to FIG. 4.

Thermal Energy Recovery: Thermal Energy Recovery System consists of collecting energy (as heat) from Engine Cooling and/or other sources and use it mainly to heat up fresh air being fed to the Air Intake System. Recovered heat may be used also for other purposes. This process is considered external and independent of the Buffered ICE but includes the engine's Cooling System.

Detailed Functions and Other Considerations:

ECM Considerations: ECM software controls all aspects of the engine, including receiving requests from other control modules, sense operator requests, load variations, components conditions, etc. It keeps the engine running (or not) based on those requests or conditions at the most efficient operation possible. ECM is mentioned throughout this document for specific functions, but the main purpose is the stated above. To do its job, ECM needs sensors which are not illustrated in drawings, but implicit. The ECM designer may implement one or more of the following:

ECM Review Frequency: The ECM continuously sets function and parameters for Tank System and all cylinders in all Engine Block Physical Sections, other components and systems based on some elapsed time, calculated review frequency, or any other criteria such as: events like changing load conditions, operator's input, braking, and engine operation sensors reaching low or high levels, etc. ECM responds by changing the Engine running mode and the Internal Transmission ratio of PLCs (if present), etc. Each number of cycles or when elapsed time has expired, or the triggering of some event, ECM acquires sensor values, and based on current engine running mode, assigns function and running parameters for each cylinder, then it sets the review frequency for next loop.

The parameters ECM sets for each cylinder for each group of cycles according to the function to execute, may be in degrees, if applicable to the function and valve properties: intake and Exhaust Valves timing (open/close) and lift, firing of Ignition Element (if applicable), timing and amount of fuel to inject, Tank Valve(s) open/close and lift, Pressure Difference Sensor actions enable/disable, if applicable etc.

Running Engine Modes: The ECM and engine designer determines what the engine modes may be based on engine and vehicle conditions and events, e.g.: Tank pressures below minimum: ECM main purpose is to bring tank's pressures to the normal values as soon as possible. Idle: start engine, if necessary, check engine operations, take actions if needed, and stop engine. Check again every so often. Run engine at the requested level, for vehicle engines this may be slow, medium, fast, or emergency. Cruising or maintaining speed: keep engine running at the level it provides the desired speed or load conditions. Reduce Speed or Load Conditions to the requested level: slow, medium, fast, or emergency based on braking pressure for vehicles. Standby: prepare for short or long standby. Settings may specify options. Shut Down: prepare for long standby stop all operations.

Special Engine Designs Considerations:

Ultimate Flexibility Engine and Overall Preferred Embodiment: ultimate flexibility is provided by an engine with Cylinder-Type3 on ALL cylinders and adequate size Tank System that allows for kinetic energy recovery in most cases, refer to "FIG. 5". Cylinder-Type3 cylinders can execute all Cylinder Level Functions.

Mechanical Valves Engine: It may be possible for a Buffered ICE Engine to operate with all or some mechanical valves control, but this brings limited functionality when compared to engines with Continuous Variable Valve Timing Valves. This engine may be possible with special purpose cylinders, i.e., some cylinders dedicated to HPG and Fresh Air Charging and other groups dedicated to Power Generation. FIG. 3 may be a good design for Mechanical Valves.

Tank Valves with Cylinders Considerations: It is possible to have Tank Valves with different properties or components e.g., for Mechanical Valves. More than one Tank Valve per cylinder may be used. Tank Valves must be able to resist or prevent explosion forces (knocking) while valve is closed and must operate as expected during the programmed times for opening and closing of the valves regardless of the pressure difference between tank and cylinder. Some possible valve types may be Outwardly opening poppet, this is the preferred type and the functional drawing in FIG. 8 illustrates it. Rotary, slider, sleeve, and other types as long as they do not open to inside the cylinder. The symbol used on the drawings for these valves is an arrow pointing inside the cylinder, this doesn't mean the direction of the flow, but it means that the most likely valve type is "outwardly opening poppet". The possible flow of HPG is bidirectional when Tank Valves are in the open position and the actual flow depends on the instant pressures.

Process Timing Diagrams Considerations: Refer to FIG. 9A to 9N. Each page in the Process Timing Diagrams has one diagram. Each diagram shows, first section on left: figure number, function description and cylinder types where the function can be executed. On the right side it contains a Sinusoidal Diagram corresponding to two complete 360 degrees cycles, which correspond to first and last cycles, in case they are different. The following five sections show the component description with legends. Close/off and open/on, and on the right size, space to indicate the approximate timing when the open or close happens. All components are shown in Function Process Timing Diagrams because Cylinder-Type3 can execute all functions and it has all components (except CA valve). For cylinder types other than Cylinder-Type3, components not present should be ignored. For Compressed Air (CA) Functions, fuel and spark is combined in one section to leave space for the CA Tank System valve, but also because if they were present (e.g., in Cylinder-Type1, Cylinder-Type3), they both would remain closed/off for the duration of the CA Function. For multiple consecutive cycles of a function in the same cylinder, the following applies for the Tank Valves. If a valve is to be closed at the end of the cycle, but it is also to be opened at the beginning of next cycle, the closing may not take place and valve is just kept open (FIG. 9F Deactivated). If a valve is to be closed at the end of the last cycle of a function, but it is also to be opened at the beginning of first cycle of the next function, the closing may not take place and valve is just kept open. This is not illustrated in Timing Diagrams. ECM determines the actual opening and closing (on and off)

timing of components. Process Timing Diagrams illustrate the approximate timing range trying to show the relative timing of other components (FIG. 9A). HPG Generation for spark ignited BUFFERED ICEs—downwards stroke, the fuel injection takes place while the Air Intake Valve is open and ends normally before valve closes. The Spark is produced late in the Upwards stroke compared to FIG. 9B HPG Generation for Compression Ignited BUFFERED ICEs, where Air Intake Valve is opened during the Downwards stroke, no Spark Plug is present, and fuel injection happens late in the upwards stroke.

HPG Generation System Considerations and Related Functions: the HPG Generation System consists of a set of cylinders in one or more Engine Block Physical Sections, working on feeding the Tank System of high temperature and Pressure Combustion Gases (HPG) and fresh air.

HPG Generation Cylinder Level Function: This process is very similar to the first two strokes of a S4S-ICE. It may vary depending on engine design.

Air, Fuel Levels: The amount of air charged during the downwards stroke is determined by the ECM. This may vary continuously, be a single level (optimal), or a set of levels can be defined (e.g., low, normal, high). Fuel may be calculated by the ECM to always be Stoichiometric to the amount of air charged. Ideally there would be no throttling valve and full air would be loaded in the cylinder for all cylinder functions controlled only by the Intake Valve timing, if necessary.

Variable Compression Ratio: The ignition happens during the upwards stroke at a point where the cylinder's "Compression Ratio" matches the fuel's maximum. Low levels of air charged provide better efficiency because the explosion happens closer to top dead center where the force needed to push the HPG to the Tank are minimal.

Ideally, HPG Generation would be combined with other functions that charge fresh air to the Tank System.

Air-fuel mixture Ignition: The ignition process may vary with engine conditions. Three main options to ignite the mixture are evident: 1—Spark Ignition: spark plug (if any) may ignite the mix before it auto-ignites to avoid knocking, although knocking may not happen if tank valve opens before it causes any damage, the ECM determines the timing of firing for the optimal combustion. 2—Fuel Injection Ignition: similar to Diesel engines with direct injection of fuel at high compression ratios. 3—HPG Ignition: when the HPG inside the Main Tank has reached certain temperature-pressure, as the Tank Valve (32) opens, the HPG from the tank may get into cylinder from tank and ignite the air-fuel mixture. 4-Mixed Ignition: A combination of at least two of the above.

If Tank's pressure is below minimum operations level a special process to bring tank pressure to minimum operations level is used to raise the tank's pressure to that minimum using the Engine Starter (61).

If Tank's pressure is below normal operations level a special process is used to bring tank's pressure to that normal level using the Power Generation System with no load connected to drive the engine.

Normal Process, Tank at or above Normal Operations Level: This may be the process most of the time, happening in all cylinders performing HPG Generation.

"FIG. 9A HPG Generation for Spark Ignited BUFFERED ICEs" Process Timing Diagram shows the process below: Power Generation may be running normally in other cylinders, driving the engine's load. Piston (22) is at top dead center and Air Intake (23) and Tank Valves (32) are closed. Piston (22) starts going down as air. Air Intake valve (23) starts to open normally right after top dead center. Air-fuel mixture is drawn or forced until the desired mass is reached as Air Intake Valve (23) closes. Air-fuel mixture is compressed as Piston (22) goes up to a point where the Spark Plug (25) (if any), fires or mix auto-ignites and combustion is initiated. This happens close to top dead center so the force necessary to go against the explosion is relatively small. Tank Valve (32) opens right before or right after. The firing of the Spark Plug (if any), the ECM's calculated time, Tank Valve's Pressure Difference Sensor TV-PDS (if present and enabled), is triggered. In all cases, the HPG's pressure after Tank Valve opens may aid in starting or completing the combustion while the Tank Valve (32) is opened. Piston (22) reaches top dead center as the Tank Valve (32) closes. At this point, a small amount of HPG remains in the Top Chamber (26) at the tank's pressure and a new cycle is initiated. More cycles are executed as above until the ECM determines the cylinder needs to be changed to a different function, engine is being stopped, etc.

FIG. 9B HPG Generation for Compression Ignited BUFFERED ICEs Process Timing Diagram is like that of Compression ignited ICEs. The process itself is not described, but it is well known.

Cylinder Level Function Main Control Variables: 1—The amount of air that is loaded into the cylinder with each cycle. 2—The amount of fuel and timing of Fuel Injection (16). 3—The timing of the Ignition Component firing (if any), or the calculated ignition timing. 4—Opening/closing time of Tank Valve. 5—Number of Cylinders assigned to this function per cycle.

Cylinder Level Function Advantages: 1—Continuous Stoichiometric air-fuel mixture. 2—No throttling losses is possible. 3—Variable Compression Ratio by starting ignition nearly before the fuel's self-ignition or let it self-ignite. 4—Engine Efficiency at low air charge levels because ignition happens very close to top dead center. 5—Ignition may be initiated by spark plug, pressure when Tank Valve opens and HPG enters cylinder, or when fuel is injected into the cylinder containing high pressure air (Diesel). 6—Knocking is being prevented and/or avoided.

Fresh Air Charging Cylinder Level Function: This Cylinder Level Function may be set by the ECM, typically during "soft braking" to recover kinetic energy from the running engine and vehicle/load by forcing fresh air into the tank, increasing the pressure and temperature inside it. This Cylinder Level Function may happen during normal HPG Generation process because it helps balance net power during Synchronous Operations of Engine Combined Cylinder Level Function. Efficiency of HPG expansion during Power Generation Cylinder Level Functions is increased regardless of why this Cylinder Level Function was executed because the "Specific Heat Ratio" is increased.

Normal Process: Refer to "FIG. 9C Fresh Air Charging" Process Timing Diagram The process is almost the same as the HPG generation normal process above, except that no fuel is injected, and no firing of spark plug is necessary. When the air is compressed close to top dead center and the tank valve opens, HPG from tank immediately heats up the air in the cylinder, as this is injected into the tank. Depending on how much energy is desired to be stored in the tank, more air than normal may be forced into the cylinder during admission. This is obtained by increasing the speed of the Supercharger (if any) and/or opening Air Intake valve (23) earlier and keeping it open as needed. Cooling needs may be reduced in this mode because fresh air cools cylinder down during these cycles. This method may help complete combustion of any partially burnt fuel inside the Tank and reduces pollutants. Cylinder Level Function Main Control Variables: Fresh Air Charging: the variables are the same as for HPG Generation, except that no fuel is injected, and the firing of the Spark Plug (if any) is not necessary.

Cylinder Level Function Advantages: 1—Engine efficiency increase during HPG expansion in Power Generation because the "Specific Heat Ratio" is increased. 2—Cooling needs may be reduced. 3—This Cylinder Level Function may help complete combustion of any unburned fuel inside the Tank System. 4—Kinetic energy recovery when this Cylinder Level Function is executed during engine braking when engine is being driven by the kinetic energy of the vehicle or load.

Power Generation System Considerations and Related Functions: The Power Generation System is a set of cylinders in one or more Engine Block Physical Sections, working on the expansion/exhaust cycles, using the tank's stored energy as HPG to produce rotating power and torque at the best possible efficiency. The pressure in the Main Tank must be at minimum operations level or higher for the Power Generation System to operate.

Power Generation Cylinder Level Function: These processes are very similar to the last two strokes of a S4S-ICE:

Tank below Minimum Operations Level: Power Generation Cylinder Level Function cannot be executed at Tank Pressures below the minimum. Power Generation Cylinder Level Function may be executed at pressure less than the normal operations level, but only to keep engine rotating with no external load. Normally, the starter gets disengaged.

Normal Process, Tank at or above Normal Operations Level: Refer to "FIG. 9D Power Generation" Process Timing Diagram. Piston (22) at top dead center, ready to start descending; Tank (32) and exhaust (43) valves normally closed. Piston (22) starts going down and Tank Valve (32) opens at top dead center. HPG from the Tank (30) enter cylinder and pushes piston down with very strong force. The Tank Valve (32) starts closing at a position that will leave the correct amount of gases in the cylinder according to engine conditions and desired power. Piston (22) keeps going down under pressure from the high-pressure gases until it gets to bottom dead center. The exhaust valve starts to open as piston starts going up normally, but it may start opening late in the downwards stroke. Piston (22) keeps going up extracting gases until it reaches top dead center. The exhaust valve closes at top dead center and a new cycle starts. The rotating energy needed to continue with the cycles on the Power Generation System (and HPG Generation System if connected), is provided by other Power Generation System's cylinders and/or the kinetic energy in Flywheel(s) (63, 69), and all rotating components and Engine Load. More cycles are executed as above until the ECM determines the operation of the Power Generation System needs to be stopped or reviewed. Most likely this happens because the tank's pressure gets below normal operations level or load or engine conditions are changing.

Efficiency Considerations and Variable Expansion Ratio: During these cycles, efficiency is very important. As indicated above, the ECM calculates the optimal position where the Tank Valve (32) closes. If Tank Valve opens at top dead center, then the "Expansion ratio" may be calculated as the Top Chamber (26)+Piston (22) displacement at the point where the Tank Valve is closed. Divided by (Top Chamber plus Piston (22) total displacement) the highest efficiency for any pressure would be at the point with the highest expansion ratio. This is where the greatest flexibility exists for Power Generation and may be considered as "Variable Expansion Ratio".

Torque/Power Considerations: On conditions where torque/power is more important than efficiency, the Tank Valve (32) may be closed late in the downwards stroke (e.g., at angle where Connecting Rod (27) is perpendicular with Crankshaft's arm or even at 90 degrees). This will raise the temperature inside Power Generation cylinders and will consume tank's contents faster. It may also be less efficient but may be used in emergencies and other conditions. Another very important factor is the number of cylinders assigned to this function per cycle.

Engine Speed: Engine may be able to run at slower speeds (RPMs) than conventional engines. This is especially useful during standby, idling, or low power demand conditions.

Reaction Time to changing demand: Since there is energy stored in the Tank System (HPG) and the Power Generation System does not depend only on the HPG being generated by the HPG Generation System at that moment, ECM can use said stored energy by changing the operation parameters of the Power Generation System to produce an almost instant response, some examples follow: if a power increase request is recognized (accelerator pedal pushed quickly), ECM can open the valve of the Emergency Power Tank Section (39-H, if any) of the Tank System and immediately increase the pressure available to the Power Generation System and/or change the Tank Valve (32) timing to close at a higher position (angle where Connecting Rod is perpendicular with Crankshaft's arm, if the valve allows it). This feature avoids the turbo-lag experienced when turbocharging is being used. On Emergency breaking, ECM can execute the Engine Braking Functions.

Cylinder Level Function Main Control Variables: —Tank's pressure. Open (top dead center normally) and close timing of Tank Valve. Open timing of Exhaust Valve (bottom dead center normally). Close timing of this valve defaults to top dead center for normal power generation. Number of Cylinders assigned to this Function per cycle.

Cylinder Level Function Advantages: Flexibility and efficiency of power and torque generation, varying pressure in tank, Tank Valve timings and the number of cylinders assigned to this function per ECM parameters. Lower engine speed for the same power may be possible. Possible full torque at low engine speed. Quick Reaction time to change in demand. Lower Exhaust Noise Levels because of HPG not coming from an explosion directly.

Power Generation with Partial Exhaust Cylinder Level Function: This Cylinder Level Function is like the standard Power Generation Cylinder Level Function above. The main difference is the point where the Exhaust Valve (43) is closed at top dead center vs. earlier during the upwards stroke for Partial Exhaust Cylinder Level Function (refer to "FIG. 9E Power Generation with Partial Exhaust" Process Timing Diagram).

In S4S-ICEs, the exhaust valve is closed at or very close to top dead center of the upwards stroke because combustion gases interfere with the combustion in the next cycle. Since there is no combustion in the Power Generation System of Buffered ICE design, it is possible to close the exhaust valve ahead of time, leaving a portion of gases in the cylinder. This may be beneficial to the engine efficiency in the next cycle if the portion of gases left creates high pressure in the area close to top dead center, where little power is needed to compress them without slowing the engine too much. The energy needed to compress the exhaust gases left when exhaust valve is closed early may be provided by increasing the power being generated (closing the Tank valve a little after) during the downwards stroke of all cylinders performing this function. The net power provided by this cycle is the power generated in the downwards stroke. Less power lost by compressing the exhaust gases left, less friction and other common losses. The ideal position where the exhaust valve is closed can be determined by solving the derivative of the net power formula Equals zero. ECM may have quick access tables for easy determination. These tables can be obtained also during actual engine testing and be dynamically adjusted by the ECM. This Function may be used to improve efficiency in Buffered ICE and in engines with separate expansion cylinders like split cycle engines, steam engines, and other heat engines.

Cylinder Level Function Main Control Variables: Open and close timing of Tank Valve and open and close timing of Exhaust Valve.

Cylinder Level Function Advantages over standard Power Generation: Increased engine efficiency and less contamination released to the environment.

Deactivated Cylinder Level Function: the purpose of this Function is to reduce energy consumption when operation of the cylinder is not necessary and other cylinders must continue operating.

The main requirement to implement the Deactivated Function if no better option is available, is to be able to keep the tank valve closed and reduce to a minimum compression and/or vacuum losses. Deactivated Function is equivalent to "Variable Displacement" in standard ICE functionality. Better options rather than deactivated may be physical disconnect of the cylinder if a CC-Power Level Connection (72) is present or executing the Fresh Air Charging Cylinder Level Function, if possible.

Normal Operation: There are a few ways to implement this Function depending on Cylinder Type (no fuel is injected regardless of what option is selected). For example, —Option 1 is to keep all components other than Tank Valve closed or off and to open Tank Valve at top dead center just enough time to allow enough HPG to avoid vacuum losses and to open it again during the upwards stroke just before top dead center to return HPG to Tank. This option works for all cylinder types. For simplicity, only option 1 Process Timing Diagram is shown (Refer to "FIG. 9F Deactivated" Process Timing Diagram).

Cylinder Warm-Up Cylinder Level Function: HPG is cycled through the cylinder, but the HPG is charged back to the Tank System. This Cylinder Level Function is normally performed during a cold engine start under the "Fast Engine Warm-Up" Engine Level Function.

Available for all types of cylinders. Basic process (Refer to "FIG. 9J Cylinder Warm-Up" Process Timing Diagram), is to keep Tank Valve (32) open and all other valves and components closed during the cycles. This causes the maximum force during the downwards stroke and requires almost equal force to return HPG to the Tank System. This Function may only be done in multiple cylinder engines, e.g., pairs cylinders, such that the power generated during the downwards stroke of cylinder A is being used to drive up piston B, and vice versa. A starter may be used if necessary. HPG generation capable cylinders may perform HPG Generation instead of this Cylinder Level Function. Other variations of this process may open Tank Valve (32) for only a portion of the downwards stroke then close it, and reopen it during the upwards stroke at the same position it was opened, etc.

Cylinder Level Function Advantages: Fast cylinder warm-up without wasting Tank's HPG contents.

Release HPG from Main Tank to Exhaust Cylinder Level Function: This Cylinder Level Function may be used mainly in a maintenance shop from a control device to release Tank System's contents to the exhaust system for repairs, Tank System changes, etc. A Tank Safety valve may be available with similar functionality. It is available for Cylinder-Type2, Cylinder-Type3, and Cylinder-Type4.

Normal Release Process: Refer to "FIG. 9M Release HPG from Main Tank to Exhaust" Process Timing Diagram. Available for cylinders with exhaust and Tank Valves, all other valves kept closed. Piston at top dead center, Tank (32) and Exhaust (43) valves closed. Tank valve (32) opens and lets sufficient HPG to avoid vacuum losses and to keep engine running at the desired RPM range, then closes. The piston keeps going down until it reaches bottom dead center. The upwards stroke starts as Exhaust Valve (43) opens and starts releasing HPG in cylinder. The Exhaust Valve stays open for the remaining upwards stroke. At the point calculated by the ECM, the Tank valve (32) opens, and this causes HPG to directly go to the exhaust system. Opening the Tank valve at bottom dead center may exceed the exhaust capacity and/or make the cylinder very hot. Piston reaches top dead center as the exhaust and Tank Valves close, and a new cycle starts. Other variations of this process exist with similar results, but this is very simple. This process could also be accomplished by combining it with other Cylinder Level Functions.

Engine Braking Cylinder Level Function: This Cylinder Level Function is set by the ECM, typically during "Hard Braking" or other special conditions. The intention is to use the pressure in the tank to create opposing power and reduce the engine's RPMs and vehicle speed and doing this without releasing HPG to the exhaust system. During this Function, the engine is normally being driven by the kinetic energy of the load. Refer to "FIG. 9G Engine Braking" Process Timing Diagram. Process may be:

Downwards Stoke: Valves other than the Tank Valve (32) are kept closed. Starting at top dead center of the downwards stroke the Tank Valve (32) is opened a minimal time to avoid negative pressure, then closes for the remaining of the downwards stroke.

Upwards Stroke: Again, valves other than the Tank Valve are kept closed. At bottom dead center, or some point of the upwards stroke, the Tank Valve (32) opens and is kept open allowing HPG to enter cylinder. This creates opposing power at the Crankshaft (62), reducing the engine RPMs without wasting gases to the exhaust. Tank Valve closes as the piston (22) reaches top dead center. Note the point where the Tank Valve is opened, depending mainly on how hard the brake is pressed, with a maximum of Bottom Dead Center.

More cycles are executed as above until the ECM determines the Cylinder Level Function of the cylinder needs to be changed. During this mode, the braking system may be engaged if necessary. In this process, no HPG gases are lost but temperature inside the cylinder may rise very quickly, so this process may be used only for a short time. This process may increase or decrease the energy stored in tanks.

Cylinder Level Function Advantages: Very powerful and effective method of slowing engine (and Load) speed using tank contents without releasing HPG to the environment. Net Energy stored in Tanks may increase. Longer duration of brakes.

Engine Braking with Fresh Air Charging Cylinder Level Function: The process is very similar to the Engine Braking Cylinder Level Function. The purpose is to do some kinetic energy recovery by charging fresh air to the Tank System if the pressure has not reached the maximum level. The main difference with Engine Braking Cylinder Level Function process is that the Air Intake Valve (23) is not kept closed all the time, but it operates normally as follows. Refer to "FIG. 9H Engine Braking with Fresh Air Charging" Process Timing Diagram. Process may be: Downwards Stoke: Starting with all valves closed at top dead center, the Air Intake valve (23) opens letting fresh air into the Cylinder. The Air Intake valve is closed at a position where the desired amount of air is inside the cylinder and is kept closed for the remainder of the Stroke. Refer to “Engine Braking Cylinder Level Function” above for the “Upwards Stroke” and remaining of the process.

Cylinder Level Function Advantages: Additional kinetic energy recovery on top of the regular Engine Braking Cylinder Level Function.

Fresh Air-Cooling Cylinder Level Function: The purpose of this Cylinder Level Function is to cool down a cylinder by cycling fresh air through the cylinder from the Air Intake directly to the Exhaust System. This Function is available for cylinders having both Intake and Exhaust Valves. Refer to “FIG. 9I Fresh Air Cooling” Process Timing Diagram. This Function process may be: From Piston at top dead center, open Intake Valve (23), Piston starts download stroke. Air is loaded into the cylinder from the Intake Valve (23) until piston gets to bottom dead center. Intake Valve is closed, and Exhaust Valve (43) is opened as piston starts upwards stroke until it gets to top dead center. This process cools down the cylinder and may be used when cylinder gets hot after high power demand, Engine Braking, or any other reason. This functionality may be implemented in any type of Internal Combustion Engine, e.g., S4S-ICE, Rotating, etc. Cylinder Level Function Advantages: Cools down inside of cylinders directly.

Power Generation with Pre-Loading of Fresh Air Cylinder Level Function: This Cylinder Level Function is very similar to the standard Power Generation Cylinder Level Function above; the main difference is that the Tank Valve does not open at Top Dead Center. The Air Intake valve (23) opens at Top Dead Center and closes at the programmed position as the Tank Valve opens. The remaining process is similar to the standard Power Generation Function. Refer to “FIG. 9N Power Generation with Pre-Loading of Fresh Air” Process Timing Diagram. The main purpose of this Function is trying to improve engine efficiency and torque by opening the Tank Valve when it is more effective without causing vacuum losses and using the extra fresh air on top of the HPG being released. ECM may have quick access tables for easy determination of the ideal Tank Valve opening position. These tables can be obtained also during actual engine testing and be dynamically adjusted by the ECM. This Function may be used to improve efficiency in Buffered ICE and in heat engines. Cylinder Level Function Main Control Variables: Open and close timing of Intake Valve (23), open and close timing of Tank Valve, and open and close timing of Exhaust Valve (43). Cylinder Level Function Advantages over standard Power Generation: —Increased engine efficiency and less contamination released to the environment.

Compressed Air Tank System Considerations and related functions: A Compressed Air Tank System may be included in the engine design for these main reasons: 1—To drive some devices (e.g., brakes) other devices could also be adapted to use CA as the driving force (e.g. opening and closing of some or all the valves). 2—When the Main Tank may need additional fresh air very quickly (e.g., during Emergency Power demand). 3—Additional functionality may be added for automatic or manual tire inflation outlets for the operation of pneumatic tools, etc.

CA Tank System Fresh Air Charging Cylinder Level Function: This Cylinder Level Function is only available if a CA Tank System is present, and the ECM has determined it is necessary to recharge it. It is available for Cylinder-Type4 (Preferred), Cylinder-Type3 and Cylinder-Type1 cylinders connected with the CA Tank System. This Cylinder Level Function may be executed by the ECM to maintain the pressure in the CA Tank between normal low and normal high levels. ECM may assign high to low priority, or when engine enters one of the kinetic energy recovery modes, ECM may top off CA Tank to normal high level.

Normal Charging Process: Refer to “FIG. 9K CA Tank System Fresh Air Charging” Process Timing Diagram. No HPG are allowed in the Compressed Air Tank, this means HPG Tank Valves (32) cannot be opened simultaneously with Compressed Air Valves (32CA). For Cylinder-Type1 and Cylinder-Type3 cylinders, no fuel is injected and firing of Spark Plug is not necessary. Exhaust valve is kept closed for the durations of these cycles. Piston (22) is at top dead center and Intake (23), Tank valves (32), and CA Tank System Valve (32CA) are closed. Intake Valve (23) opens at the programmed positions during the downwards stroke, normally at TDC. Air-only is drawn or forced until the desired air mass is reached or piston reaches bottom dead center as Intake valve (23) closes. Air is compressed as piston (22) goes up to a point where CA Tank System Valve (32CA) starts opening. This happens close to top dead center, ideally when the pressure inside the cylinder matches the pressure of the CA Tank System. Piston (22) reaches top dead center as the CA Tank System Valve (24) closes and a new cycle is initiated.

CA Tank System to HPG Tank Charging Cylinder Level Function: This Cylinder Level Function is only available if such tank is present, and the ECM has determined it is necessary to retrieve some of its contents and charge them to the Main (HPG) Tank on an emergency basis, or for any other purpose. It is available for Cylinder-Type4 (Preferred), Cylinder-Type3 and Cylinder-Type1 cylinders connected with the CA Tank System. This function is executed when the ECM determines that it is advantageous to the operation of the engine to retrieve some of the air in CA Tank System and transfer it to the HPG Main Tank. If a dedicated CA Tank for devices is used, it may restrict this Cylinder Level Function.

Normal Charging Process: Refer to “FIG. 9L CA Tank System to HPG Tank Charging” Process Timing Diagram. No HPG are allowed in the Compressed Air Tank. This means HPG Tank Valves (32) cannot be opened simultaneously with Compressed Air Valves (32CA). For Cylinder-Type1 and Cylinder-Type3 cylinders, no fuel is injected and firing of spark plug is not necessary. Exhaust valve (43) is kept closed for the durations of these cycles. Piston (22) is at top dead center, Intake (23), HPG Tank (32), and CA Tank System (32CA) valves are closed. CA Tank System Valve (32CA) opens at the programmed positions during the downwards stroke. Compressed Air is forced into cylinder until the desired air mass is reached or piston reaches bottom dead center as CA Tank Valve closes. Air is compressed further as piston (22) goes up to a point where HPG Tank Valve (32) starts opening, ideally when the pressure inside the cylinder matches the pressure of the HPG Tank. Piston (22) reaches top dead center as the HPG Tank Valve (32) closes and a new cycle is initiated.

Alternating of Cylinder Level Functions Considerations: When possible, alternating functions in HPG Generation and Power Generation System's cylinders may produce a more evenly cylinder wear, reduce the operating temperature of the engine, and cooling load. The “alternating” does not have to be done each engine cycle, but ECM may calculate several cycles depending on engine conditions. Cylinders participating in the “alternating” must have the same Cylinder Type or be able to perform the Cylinder Level Function(s) being alternated. Technically, all functions possible in a Cylinder Type can be 'alternated.' Cylinder-Type3 is the most flexible cylinder type since it can alternate all Functions. The "alternating" of HPG Generation and Power Generation Cylinder Level Functions in a cylinder promotes more uniform mixture of combustion gases and fresh air inside tanks. When Power Generation with partial exhaust function is being done in a Cylinder-Type3 cylinder, and it will be alternating to an HPG Generation function on the next cycle, the last cycle of partial exhaust needs to extract all gases to the exhaust system. Otherwise, the spent gases left interfere with the HPG Generation function.

Alternating of Cylinder Level Function Advantages: More uniform cylinder wear and operating temperature and better mixture of combustion gases and fresh air inside Tank System.

Combined Cylinder Level Functions: ECM determines what the best combination of functions for the available cylinders are at any cycle or group of cycles. At any cycle, there may be one or more different functions being executed simultaneously depending on the number cylinders, its types, and other engine conditions like power demand, etc. Combination of some functions may not make sense, like combining Engine Braking Functions with any of the Power Generation Functions.

Special Combined Cylinder Level Functions:

Fast Engine Warm-up Combined Cylinder Level Function=HPG Generation Cylinder Level Function and/or Cylinder Warm-Up Cylinder Level Function+Power Generation Cylinder Level Function: This combination of Cylinder Level Functions raises internal temperature of cylinders with none or minimum loss of HPG from Tank System. ECM determines what combination of Cylinder Level Functions are appropriate. Engine's load must be disconnected. Instead of this process, HPG generation capable cylinders may execute HPG Generation Cylinder Level Function to restore pressure levels in tanks and raise their temperature. Non HPG Generation capable cylinders may execute Cylinder Warm-Up Cylinder Level Function. One or more Power Generation cylinder(s) may provide rotation by executing Power Generation Cylinder Level Function with just enough power to keep engine rotating. This process may end when the engine reaches normal operating temperature or the engine's load is engaged.

Engine Synchronous Operation Combined Cylinder Level Function=HPG Generation+Fresh Air Charging+Power Generation: This combination of Cylinder Level Functions is set by the ECM to optimize efficiency and reduce cooling needs. It is also used to keep the HPG Generation System running continuously generating the same amount of HPG that the Power Generation System is consuming. It consists of calculating a group of cycles where depending on the Cylinder Type for each cycle a cylinder may run an HPG Generation, a Fresh Air Charging, or one of the Power Generation Functions until the set of cycles is completed and the ECM recalculates it. For Cylinders executing a Fresh Air Charging Function, the process and the advantages are the same as specified in section of same name above. For example, if we have a three-cylinder engine of Cylinder-Type3 and the ECM has calculated that the following 5 cycles generate approximately the same HPG that the Power Generation System is consuming:

| Cycle | Cylinder-1 | Cylinder-2 | Cylinder-3 |
|---|---|---|---|
| 1 | HPG Gen | Air Charging | Power Gen |
| 2 | Air Charging | Power Gen | HPG Gen |
| 3 | Power Gen | Air Charging | Power Gen |
| 4 | Power Gen | Power Gen | Air Charging |
| 5 | Air Charging | Power Gen | Power Gen |

All Cylinder Level Functions above may have "levels" of air/fuel, HPG, etc. which are not being specified in the example above. Note also there are many combinations of cycles that can produce the same amount of HPG, including all HPG Generation cylinders at high or normal fuel for "n" cycles followed by all cylinders doing Fresh Air Charging for "m" cycles, etc. One not optimal possibility is to operate all HPG Generation cylinders at a variable air-fuel level for all cycles, obtaining the same HPG as above. This process prevents charging additional air into the tanks and misses the advantages it has. Another non-optimal possibility is to combine HPG Generation in certain cylinders with other cylinders in "Deactivated" (see section of same name above) again, this process prevents charging additional air into the tanks and misses the advantages it has.

Kinetic Energy Recovery Combined Cylinder Level Function: Kinetic energy refers to movement and it applies to the rotating engine parts and when engine is installed in a vehicle to the moving vehicle or load. Current Hybrid and Electric Vehicles convert kinetic energy into electricity and store it in batteries. The energy is then converted back to movement using Electric Motors as needed. Buffered ICEs convert the kinetic energy of the engine and vehicle as HPG and stores it in the Tank System, then use the HPG stored to convert it back to movement by the Power Generation System. Both the EVs and Buffered ICEs do this back-and-forth conversion in "Native" form without using any additional equipment.

ECM uses the following Cylinder Level Functions to store kinetic energy as HPG: Fresh Air Charging: this is the preferred Cylinder Level Function to use until the Tank System reaches the maximum safe pressure. Engine Braking with Fresh Air Charging: this is an alternative to Fresh Air Charging to use when necessary and possible before Tank System reaches the maximum safe pressure. Engine Braking: Used once the Tank System reaches the maximum safe pressure. Tank System total capacity and the maximum pressure allowed in those tanks limits the total energy stored possible in Buffered ICEs. ECM may change the External Transmission (80) ratio to increase engine RPMs during Cylinder Level Functions indicated above. ECM executes this process until the desired conditions are reached, which may include "Idling" at certain speed and engine stop. Combined Cylinder Level Function Advantages: Increased engine efficiency and reduced contaminants.

Engine Level Functions:

Stopping and Restarting Engine using HPG Engine Level Function: Requires ECM to operate Tank Valves (32) electronically. For multiple Engine Block Physical Sections connected, all sections may be stopped and restarted. Stopping of engine in preparation for restart: ECM executes the Kinetic Energy Recovery process, plus application of physical brakes if necessary until engine stops. The requirement is to leave at least one cylinder after top dead center, preferably before 90 degrees. A special device which works when the engine is rotating at a few RPMs can lock the Crankshaft into position, or after the engine stops, the starter may be operated for a very small time and reposition Crankshaft accordingly. Engine Restart from a stopped condition: ECM opens the Tank Valve of the cylinder(s) in the downwards position to start rotation. If the engine does not move, the normal starting process using the starter may take place. Engine Level Function Advantages: ECM may automate this functionality as desired.

Standby Functionality Engine Level Function:

Standby: System prepares for a short-term turn off by: ECM uses the "Stopping and Restarting Engine from Tank's contents Engine Level Function" as necessary when the engine does not need to be running. The engine may run at some minimal speed if cabin comfort devices or other internal loads require it. This functionality may be entered automatically while the engine (or vehicle) is idling. Extended Standby: This Functionality may be used to keep the Tank at the minimum operations level overnight, or extended periods of time. The HPG Generation System may operate sporadically to keep the tank at some minimum operations level without any exhaust gases expelled. It may also keep the engine and cabin at minimal temperature levels if exhaust gases may be expelled to the outside. Shut Down: Executes "prepare to stop", then all power is cut off. The Tank System will lose some pressure and temperature with time and may be necessary to use the starter (61 and/or 67) to restart. Prepare to Stop: This may be a manual operator intervention on the communication device or remote when an app (e.g., Google maps) identifies that the vehicle is close to its destination and communicates the condition to the ECM. Prepare to Start: This is probably a manual operator intervention communicating remotely with the ECM because it will start using vehicle in a few minutes, etc. Engine Level Function Advantages: Operator convenience and equipment protection.

Engine Asynchronous Operation Engine Level Function: This normally happens on a request to increase or decrease the power or speed, manual, or identified by sensors (e.g., a slowdown of a car when it enters a hill under "cruise control"). Depending on the request, tank conditions, and many other factors, ECM determines what engine conditions to change e.g., Tank System Valves, what functions to execute, and what parameters to use to fulfill the request after which it may enter a Synchronous Operation Combined Cylinder Level Function for the new stable conditions or kinetic energy recovery combined Cylinder Level Function for a slow down or braking. Engine Level Function Advantages: Quick reaction to request, increased power and torque, operator convenience, and equipment protection.

Power Level Components Considerations: This area refers to the components that have to do with Crankshaft rotation: Components Considerations: For a complete list of components, refer to the descriptions regarding FIG. 2 and FIG. 4 herein.

Crankshaft: Same as in S4S-ICE with its supports, etc. Each Engine Block may contain one Crankshaft for only section A 62. For two Crankshafts, the number assigned to the Crankshaft in Engine Block Physical Section A is 62, and 68 is the number assigned to the Crankshaft of section B.

Engine Starter 61 normally rotates all cylinders. Note ECM may be able to start any Engine Block Physical Section having Power Generation Cylinders from HPG in Tank System without using the starter.

Power Level Connection for engines with Engine Block Physical Sections: each Engine Block Physical Section may be connected to one or two other sections; refer to FIG. 4 in detailed above, and "CC-Power Level Connection Functionality Engine Level Function" below for details.

CC-Power Level Connection Functionality Engine Level Function: Refer to FIG. 4. Controlled Connection Power Level Connection device 72 joins and separates two Engine Block Physical Sections with a 1:1 ratio normally. This Connection is controlled by the ECM. When the engine is turned off, ECM normally connects both sections in anticipation of engine restart by the engine starter (61).

CC-Power Level Connection Advantages: ECM controls connects/disconnects Engine Block Physical Sections for different reasons (normally for efficiency) depending on load and other conditions.

Technologies from Other Engine Types:

The design may integrate other technologies not mentioned in this document from S4S-ICE or other internal combustion engine types.

Technology and materials used in Steam, Nuclear, and other types of Heat Engines, mainly because of the high pressures and temperature they handle as well as Technology used in Gas Compressors and Split Cycle Engines, mainly because of the minimum size Top Chamber they have, may be used for Buffered ICE valves, cylinder head, and other components.

Thermal Energy Recovery Engine Level Function Considerations: Thermal Energy Recovery System consists of collecting energy (as heat) from TER1—Engine Cooling, and/or TER2—Tanks covers, and/or TER3—Exhaust and/or TER4—External TERs and use it to heat up fresh air being fed to the Air Intake System and/or used as comfort heating in an operator's cabin if appropriate. Refer to FIG. 10.

Cooling Media Type: This can normally be air, liquid, or a combination of the two. Combining media types in the sources specified is probably too complicated and not recommended. Liquid compatible with all heat sources is probably the most convenient media type and related figures assume this type although air media could be used instead having equivalent equipment and functions.

Temperature Sensors (not shown) may be needed for each thermal energy source included. Fluid lines (9) and Engine Compartment may be insulated, especially for normally cold weather places. This functionality may be especially beneficial in cold weather areas. Based on expected benefits, space availability, cost, and other conditions, the engine designer determines which of these components should be included and the physical layout, and if any, include this functionality in the engine design. The ECM determines when this functionality takes place based on engine conditions by opening or closing corresponding control valve (TERn-V) to each source to let cooling media into those devices as well as valves position in Thermal Energy Recovery Control Box 4-Vn. The additional heat in the Intake System should be taken into consideration for the calculation of air mass loaded to the HPG Generation cylinders. There are many possible designs of the Thermal Energy Recovery System. The design shown in FIG. 10 is a functional example. A different example may have the radiator in front of the Intake System so the Thermal Energy Recovery Control Box design could be simpler.

This device and functionality may be implemented in current S4S-ICEs and other Combustion and heat engine types with an Intake System where the oxidizer used may be heated. Engine Level Function Advantages: Increased engine efficiency and reduced Thermal Air Pollution.

Buffered ICE Use Considerations: Typical use of this new engine design and/or methods indicated may be: Mainly mobile engine applications, cars, trucks, construction equipment, small engines etc. Stationary, Static, and Power Generation engines are advantages of new engine design vs. the S4S-ICE, mainly in the highest efficiency, and that those engines may also have variable demands. Retrofitting of existing engines: A new engine may be installed, or just the cylinder head, ECM, and other necessary adjustments made to engines in some existing vehicles and other static and mobile engine applications. The design applies to any combination of engine type with a full or partial Buffered ICE Engine, e.g., an engine that uses a Liquid Piston Engine for HPG Generation with a Buffered ICE Piston Engine for Power Generation. Thermal Energy Recovery may be implemented in existing S4S-ICEs or any other type of internal combustion or heat engines by itself. Reciprocating Power Generation section of heat and other engines: Includes Power Generation and related functions, in particular, the use of "Power Generation with Partial Exhaust" and "Power Generation with Pre-Loading of Fresh Air" methods. Buffered ICE may consume Gasoline, Diesel, and any other engine fuel, liquid, or gas. Note use of fuel that leaves deposits behind may need additional functionality to keep operating normally. These uses may apply to all Internal Combustion Engine types such as Reciprocating, Hybrids, Rotary, OPOC, Yan, Free Piston, Liquid Piston, Astron Omega1, and other engine types, designs, or architectures. Equivalent components and adjustments assumed. Limited or additional functionality may be available for other engine types.

Emissions Impact of Buffered Internal Combustion Engine include continuous Stoichiometric Complete Combustion Reduces or eliminates generation of CO. Emissions impact further includes stable high pressure and temperature (but much less than instant values of an explosion) in tank with high Oxygen content, and time HPG stays inside it, assuring a complete combustion and reduces significantly or eliminates NOx emissions. The emissions impact may include higher Thermal Efficiency, thus reducing CO2 released to the atmosphere. The emissions impact includes native kinetic energy recovery, thus reducing fuel consumption and CO2 generation. It may include thermal energy recovery and high efficiency of the engine, thus reducing the thermal energy released to the atmosphere.

Emissions Control equipment may be placed inside Main Tank where it will be at high temperature most of the time.

Emissions may be reduced because of the reduction of requirements for cooling, lubrication, braking, muffler systems, emissions control, external transmission, etc. Modified power generation methods may reduce gases expelled to the environment.

Emissions are reduced due to continuous stoichiometric complete combustion obtained by full stoichiometric air-fuel mix, optimal ignition of air-fuel mix, combustion gases are forced into Main Tank where they stay some time before they are used for power generation and expelled. Additional fresh air may be forced to main tank providing extra oxygen for a complete combustion. High pressure and temperature in the main tank may burn any remaining fuel.

Energy efficiency features include low air-fuel mixture is more efficient during HPG generation function, elimination or reduction of throttling losses, fresh air forced into main tank increases "Specific Heat Ratio" which increases efficiency during power generation, native kinetic energy recovery, thermal energy recovery, high expansion ratio during power generation, and ECM keeps engine running during stable demand at optimal conditions.

Power torque features include the flexibility of the ECM main controlled variables during power generation, including the number of cylinders assigned per cycle, opening and closing timing of the tank valve(s), the main tank's pressure, and engine RPMs.

GLOSSARY

HPG: High Pressure Gases: These are the combustion gases generated during HPG Generation, mixed with Fresh Air charged during Fresh Air Charging.

ECM: Engine Control Module and computer-based device that controls all operations.

ICE: Internal Combustion Engine.

S4S-ICE: Standard Four Stroke Internal Combustion Engine.

Standard Automotive abbreviations: RPM, etc.

CT1: Cylinder-Type1.

CT2: Cylinder-Type2

CT3: Cylinder-Type3

CT4: Cylinder-Type4.

CA: Compressed Air.

What is claimed is:

1. A buffered internal combustion engine for reducing greenhouse emissions comprising:

an insulated main gas storage tank formed of at least one container capable of holding high pressure gases, at least one internal combustion chamber defined by a bore in an engine block with piston slideably disposed therein and a cylinder head having at least one intake valve, one exhaust valve, a fuel admittance, zero or one ignition starter, and a valve controlling the entry and exit of high pressure combustion gas between the main gas storage tank and an internal combustion engine chamber wherein an insulated conduit couples said valve to main gas storage tank;

wherein, the space between the piston at top dead center and the cylinder head is minimal;

wherein valves are electronically or mechanically controlled;

wherein at least one sensor provides control information to the ECM;

wherein at least one chamber is able to produce and load high pressure combustion gas to the main storage tank, and at least one chamber is able to produce power from the main gas storage tank's high pressure combustion gas.

2. The buffered internal combustion engine of claim 1, wherein the main gas storage tank comprises two or more containers interconnected, with no valve between them.

3. The buffered internal combustion engine of claim 1, wherein the main gas storage tank is divided into sections, and a valve controlled by the ECM controls the flow between each section.

4. The buffered internal combustion engine of claim 1, wherein at least one emissions control device is placed within the main gas storage tank.

5. The buffered internal combustion engine of claim 1, wherein at least one secondary gas storage tank formed of one or more interconnected containers in communication with the main gas storage tank via a valve controlled by the ECM.

6. The buffered internal combustion engine of claim 1, wherein at least one chamber has no exhaust valve and at least one chamber has no intake valve, no fuel source, and no ignition starter.

7. The buffered internal combustion engine of claim 1, further comprising at least one second chamber having no fuel source and no ignition starter.

8. A method of operating a buffered internal combustion engine for reducing greenhouse emissions using gaseous or liquid fuel comprises the following steps repeated continuously until a stop command is received and completed:

evaluating engine conditions;

scheduling engine start if engine is off;

setting tank system's current preferred ranges to the optimal pressure levels;

comparing current pressure levels in tank system to preferred ranges and schedule corrective action if current pressure levels are outside the preferred ranges;

comparing current speed or [load] power to the desired values and schedule increase or decrease of power or speed at the optimal efficiency and sensed urgency;

scheduling a standby or stop of engine if a request from the operator is detected, or ECM determines its need;

reevaluating parameters for a new group of cycles, and event triggers;

assigning a function to each of the chambers, and recalculating parameters;

running the engine as scheduled for the time or number of cycles calculated by executing the functions specified in each active chamber, and operating other engine components.

9. The method of claim 8 where at least one of the chambers performs a high pressure gas generation function to load high pressure combustion gases to the tank system in a buffered internal combustion engine.

10. The method of claim 8 where at least one of the chambers performs the fresh air charging function to load fresh air to tank system in a buffered internal combustion engine.

11. The method of claim 8 where at least one of the chambers performs a power generation function for the generation of power and torque by consuming high pressure combustion gas from tank system in a buffered internal combustion engine.

12. The method of claim 8 where at least one of the chambers performs the power generation with partial exhaust function, where the exhaust valve is closed before top dead center during the exhaust stroke, keeping a portion of high pressure combustion gas in the chamber for next power cycle in a buffered internal combustion engine.

13. The method of claim 8 where at least one of the chambers performs the power generation with pre-loading of fresh air function, wherein the intake valve is opened letting fresh air in before the opening of tank valve in a buffered internal combustion engine.

14. The method of claim 8 where at least one of the chambers performs the engine braking function where opposing power is created in the chamber by using high pressure combustion gas during the upwards stroke to reduce speed, and the high pressure combustion gas are charged back to the tank system in a buffered internal combustion engine.

15. The method of claim 8 where at least one of the chambers performs the engine braking with fresh air charging function where fresh air is admitted during the downwards stroke and opposing power is created in the chamber by admitting high pressure gas during the upwards stroke to reduce speed and the high pressure gas are charged back to the tank system in a buffered internal combustion engine.

16. The method of claim 8 where at least one of the chambers performs the high pressure gas generation function, while zero or more chambers are set to perform the fresh air charging function, and at least one other chamber is set to perform one of the power generation function to drive the engine at the conditions desired in a buffered internal combustion engine.

17. The method of claim 8 wherein zero or more chambers are set to perform the fresh air charging function, while zero or more chambers are set to perform the engine braking with fresh air charging function and zero or more chambers are set to perform the engine braking without fresh air charging function and the brakes applied depending on the pressure applied to the brake pedal, while the engine is being driven by the kinetic energy of the engine and load until the desired conditions are reached, or the engine stops with at least one chamber ready to perform the power generation function in a buffered internal combustion engine.

18. The method of claim 8, wherein electronic control module uses high pressure combustion gases stored in the tank system to restart the engine by opening the tank valve of the chambers ready to perform the power generation function in a buffered internal combustion engine.

* * * * *